(12) United States Patent
Lou et al.

(10) Patent No.: US 9,949,185 B2
(45) Date of Patent: Apr. 17, 2018

(54) FACILITATING MOBILE SERVICE ANCHOR MANAGEMENT

(71) Applicant: AT&T Intellectual Property I, L.P., Atlanta, GA (US)

(72) Inventors: Yuang Lou, Dunwoody, GA (US); Douglas A. Duet, Roswell, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 82 days.

(21) Appl. No.: 14/878,005

(22) Filed: Oct. 8, 2015

(65) Prior Publication Data
US 2017/0105152 A1 Apr. 13, 2017

(51) Int. Cl.
| | |
|---|---|
| *H04W 36/08* | (2009.01) |
| *H04W 72/04* | (2009.01) |
| *H04L 5/14* | (2006.01) |
| *H04W 72/08* | (2009.01) |
| *H04W 36/24* | (2009.01) |

(52) U.S. Cl.
CPC .............. *H04W 36/08* (2013.01); *H04L 5/14* (2013.01); *H04W 36/24* (2013.01); *H04W 72/0453* (2013.01); *H04W 72/08* (2013.01)

(58) Field of Classification Search
None
See application file for complete search history.

(56) References Cited

U.S. PATENT DOCUMENTS

| | | | | |
|---|---|---|---|---|
| 5,913,169 | A * | 6/1999 | Vaara | H04B 7/2606 455/443 |
| 7,912,487 | B2 * | 3/2011 | Tajima | H04L 1/0003 370/252 |
| 7,953,411 | B1 * | 5/2011 | Chion | H04W 36/0083 370/331 |
| 8,139,657 | B2 | 3/2012 | Johnson et al. | |
| 8,311,010 | B1 * | 11/2012 | Qian | H04L 47/20 370/331 |
| 8,537,851 | B1 | 9/2013 | Gossett et al. | |
| 8,594,023 | B2 | 11/2013 | He et al. | |
| 8,686,837 | B2 * | 4/2014 | Larsen | G08C 23/04 340/13.24 |
| 8,787,331 | B2 | 7/2014 | Liu et al. | |
| 8,838,123 | B2 | 9/2014 | Sadeghi et al. | |
| 8,843,148 | B2 | 9/2014 | Koudouridis et al. | |
| 8,879,573 | B2 | 11/2014 | Bahl et al. | |

(Continued)

*Primary Examiner* — Bunjob Jaroenchonwanit
(74) *Attorney, Agent, or Firm* — Amin, Turocy & Watson, LLP

(57) ABSTRACT

Mobile service anchor management (MSAM) is facilitated. MSAM is an anchor management function/system for radio frequency (RF) access configuration/reconfiguration over the downlink, and uplink separated novel frequency division duplex systems. One method comprises determining, by a MSAM system comprising a processor, that a mobile device communicatively coupled to a first network device is associated with a region in which the first network device fails to have line of sight communication with the mobile device; and assigning, by the mobile service anchor management system, the mobile device to a second network device determined to have the line of sight communication for the region. Millimeter watt (mmW) BS devices and devices that operate on other RF bands can be utilized.

20 Claims, 11 Drawing Sheets

(56) References Cited

U.S. PATENT DOCUMENTS

| | | |
|---|---|---|
| 8,892,109 B2 | 11/2014 | Panchal et al. |
| 8,972,311 B2 | 3/2015 | Srikanteswara et al. |
| 9,107,063 B2 | 8/2015 | Liu et al. |
| 2007/0189191 A1* | 8/2007 | Ades ............... H04L 41/0806 370/254 |
| 2008/0182513 A1* | 7/2008 | Hassan ............... H04W 76/02 455/41.2 |
| 2011/0077013 A1* | 3/2011 | Cho ................. H04W 72/085 455/445 |
| 2011/0292820 A1* | 12/2011 | Ekbal ................ G01S 13/765 370/252 |
| 2013/0005447 A1* | 1/2013 | Lutnick ............... G06Q 30/02 463/25 |
| 2013/0303081 A1* | 11/2013 | Chang ............. H04W 36/0061 455/11.1 |
| 2014/0098912 A1* | 4/2014 | Yin ................... H04B 7/0417 375/345 |
| 2014/0120917 A1* | 5/2014 | Yoshihara ........ H04W 36/0033 455/436 |
| 2014/0248895 A1 | 9/2014 | Wagner et al. |
| 2014/0365944 A1* | 12/2014 | Moore ................. G06F 3/0484 715/772 |
| 2015/0055447 A1 | 2/2015 | Jamadagni et al. |
| 2015/0065172 A1* | 3/2015 | Do ....................... H04L 63/107 455/456.3 |
| 2015/0092544 A1 | 4/2015 | De Pasquale et al. |
| 2015/0139048 A1 | 5/2015 | Lou |
| 2015/0156122 A1 | 6/2015 | Singh et al. |
| 2015/0208414 A1 | 7/2015 | Ji et al. |
| 2015/0281040 A1* | 10/2015 | Yamine ................ H04W 24/02 455/436 |
| 2016/0033617 A1* | 2/2016 | Hahn ................... G01S 5/0215 370/252 |
| 2016/0173199 A1* | 6/2016 | Gupta .................. H04B 10/11 398/127 |
| 2016/0309312 A1* | 10/2016 | Chin ....................... H04W 4/20 |
| 2016/0337047 A1* | 11/2016 | Khoshnevisan ..... H04B 17/318 |
| 2016/0338013 A1* | 11/2016 | Yu ......................... H04L 1/0001 |
| 2016/0356612 A1* | 12/2016 | Beaurepaire ........... G01C 21/34 |
| 2017/0048613 A1* | 2/2017 | Smus ...................... H04R 3/00 |
| 2017/0055273 A1* | 2/2017 | Sharma ............... H04W 72/085 |

* cited by examiner

FACILITATING MOBILE SERVICE ANCHOR MANAGEMENT

TECHNICAL FIELD

The subject disclosure relates generally to mobile communications, and, for example, to systems, apparatuses and/or methods of facilitating mobile service anchor management in mobile communication systems.

BACKGROUND

In traditional mobile communications, the performance of mobile radio access can largely depend on the hardware setup through the mobile device design process and/or the fixed radio frequency regulations. For example, the Federal Communications Commission (FCC) rules specify: the frequency separation between uplink and downlink pass bands in a frequency division duplex pair to avoid transmitter-to-receiver interference; frequency guard band protection between two independent radio systems to reduce mutual interference impact; the exclusion zone between transmitting and receiving equipment to control the potential interference; specially designed radio filters to reduce out-of-band emissions with sharp band edge attenuation; and/or protocols for scenarios for turning off the radio.

Additionally, mobile communication services are fast expanding in service content delivery and in service coverage scale. However, with such expansion, the wireless communication industry has a commensurate need for spectrum. Currently, the wireless communication industry is evaluating the use of spectrum in the 600 megahertz (MHz) to 700 MHz range. Millimeter wave (mmW) communication, which is typically 30 gigahertz (GHz) to 300 GHz, where wavelengths are 10 millimeters (mm) to 1 mm, is also being evaluated. However, the challenges of utilizing mmW communication for two-way mobile communications are numerous. For example, the performance of mmW communication can be degraded in shadow regions in which the mmW base station (BS) device does not have line-of-sight communication with the mobile device.

DETAILED DESCRIPTION

Figure 1:
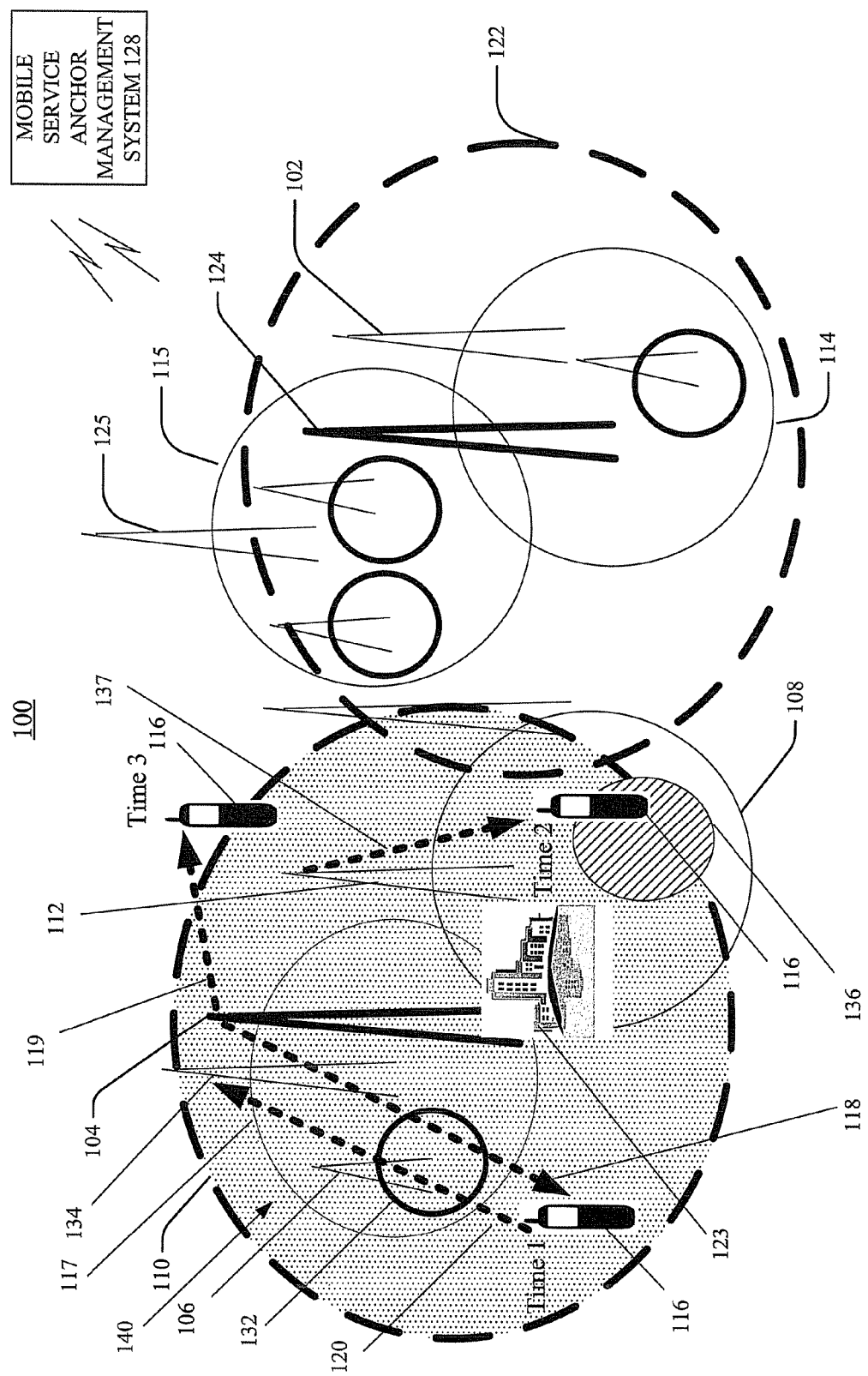
FIG. 1 illustrates an example schematic diagram of a system that facilitates mobile service anchor management (MSAM) employing a layered network architecture with a BS device uplink channel, a mmW BS device first downlink channel and a non-mmW BS device second downlink channel in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies. Further, the terms "femto" and "femto cell" are used interchangeably, and the terms "macro" and "macro cell" are used interchangeably.

In traditional mobile communications, the performance of mobile radio access can largely depend on the hardware setup through the mobile device design process and/or the fixed radio frequency regulations. For example, the Federal Communications Commission (FCC) rules specify: the frequency separation between uplink and downlink pass bands in a frequency division duplex pair to avoid transmitter-to-receiver interference; frequency guard band protection between two independent radio systems to reduce mutual interference impact; the exclusion zone between transmitting and receiving equipment to control the potential interference; specially designed radio filters to reduce out-of-band emissions with sharp band edge attenuation; and/or protocols for scenarios for turning off the radio.

Additionally, mobile communication services are fast expanding in service content delivery and in service coverage scale. However, with such expansion, the wireless communication industry has a commensurate need for spectrum. Currently, the wireless communication industry is evaluating the use of spectrum in the 600 megahertz (MHz) to 700 MHz range. Millimeter wave (mmW) communication, which is typically 30 gigahertz (GHz) to 300 GHz, where wavelengths are 10 millimeters (mm) to 1 mm, is also being evaluated. However, the challenges of utilizing mmW communication for two-way mobile communications are numerous. For example, the performance of mmW communication can be degraded in shadow regions in which the mmW base station (BS) device does not have line-of-sight communication with the mobile device.

In some mobile communication systems, a service provider can have more than one RF channel over which to provide mobile services. For example, channels in the 700 MHz, 850 MHz, and 2.3 GHz frequency bands can be employed but each RF channel is typically managed separately and independently. There are no optimized management interchanges between the different RF channels. In any particular market and at any specific time, some of the service channels will be congested by user access or under a strong interference impact while other channels are idle and therefore available for user access. From a service point of view, under such situations, the network radio resources are wasted on the idle channel while, in the channels that have more users, mobile device performance is degraded due to interference. There are opportunities to improve these limitations and facilitate optimized service provisioning across two or more (or, in some cases, all) radio channels.

With current spectrum allocations, the emphasis on performance metrics is typically focused on a fixed access sharing scenario that allows all legally permitted radio accesses to work simultaneously in a band of fixed assigned frequencies. Licensed operators constantly check performance metrics in order to protect services from interference created by spectrum allocations dictated by hardware limitations. Since spectrum used in wireless services is a scarce resource and this resource is presently fully allocated, there is an opportunity to improve spectrum management that would improve the in-band interference environment. This spectrum management methodology can allow two or more (or, in some embodiments, all) services to work simultaneously in close proximity and severely limit inter-service interference impacts. This opportunity calls for smart/adaptive coordination of network access control in real time operation. In order to make this coordination realistic and implementable, a MSAM system can employ the support of a wider coordination base across multiple service bands.

MSAM is an anchor management function/device for radio frequency (RF) access configuration/reconfiguration over the downlink, and uplink separated novel frequency division duplex systems. Any number of different RF bands can be employed to effectuate the functionality provided by the MSAM system. In one example, mmW BS devices can be utilized. In other examples, other different types of BS devices can be utilized.

Embodiments described herein can raise the utilization of network spectrum in addition to improve spectral efficiency via operations of a MSAM system. The MSAM system can perform operations in conjunction with one or more BS devices or access points and/or various network side components as described herein. One or more embodiments described herein can also make the use of mmW communication easier and cost effective in a macrocell configuration. In mmW communication, many non-line of sight areas are randomly distributed in the macrocell coverage. Since mmW communication typically utilizes line of sight transceiving conditions, the distribution of non-line of sight areas within the cell can reduce user access QoE through a conventional mobile network configuration. Smaller mmW cell coverage can lower the incidence of dropped calls but may not remove all the non-line of sight areas and smaller mmW cell coverage can negatively impact the mmW business case in macrocell configurations. One or more embodiments described herein can improve user access QoE with inter-cell radio access switching while keeping larger mmW macrocell coverage and reducing mobile device call drops in these non-line of sight areas.

The proposed MSAM system can monitor network access attempts and/or performance across various (or, in some embodiments, all) service bands controlled by the same operator and coordinate/arrange the access to achieve a higher network capacity by removing traffic congestion and interference impact on any particular band or from any particular cell site. The proposed MSAM system can thereby optimize overall network performance to the service provider and improve the QoE for users.

One or more embodiments described herein can include systems, methods, apparatus and/or machine readable storage media that can facilitate MSAM. These embodiments can benefit mobile radio service providers that have more than one radio frequency (RF) band.

In some embodiments, one or more embodiments of a MSAM system described herein can provide an efficient network access management across all (or, in some embodiments, one or more) available radio bands and/or radio access technologies through a software-based solution in addition to a particular radio access network (RAN) hardware platform. The MSAM system can remove the traditional segregation in radio service management defined by RF bands and also defined by radio access technologies.

In some embodiments, the MSAM system can provide one or more (or, in some embodiments, all) radio resources under the control of a particular service provider together in one larger network access pool, and/or improve mobile device access in terms of mobile traffic distribution to avoid traffic congestion, enhance RF coverage between line of sight and non-line of sight distributed areas in the service market, minimize RF interference through a smart system reconfiguration, improve user throughput and/or shorten network latency in operation on the basis of overall RF resources and network capabilities. Market competition can also be enhanced by raising the quality of experience (QoE) for users.

In one or more of the embodiments described herein, the MSAM system can: enable dynamic spectrum sharing through a smart mobile device access configuration; enable the mobile service expansion from licensed accesses to the unlicensed spectrum for session continuity; improve mobile user access performance and/or QoE in terms of optimized radio access, relaxed network congestion, and/or minimized RF interference; and/or enable acceleration of this dynamic flow and can help service providers to reduce the user delay.

Network coordination, which can be provided in one or more embodiments, via a MSAM system, can improve operations of heterogeneous, small cell base station offloading and/or facilitate session continuity in mobile streaming services. Further, one or more embodiments can provide lower cost network architectures relative to traditional networks since the mmW BS device downlink channel can provide downlink transmission over a larger area (relative to the downlink channel coverage area of macro cell BS device downlink channels, for example).

Although mmW is typical defined at 30 GHz to 300 GHz where wavelengths are 10 mm to 1 mm, it is noted that mmW frequencies described herein also include and/or envisage coverage of the microwave region of frequencies. The microwave region is defined as 1 GHz to 100 GHz. Communication over all such frequencies can be facilitated employing one or more of the embodiments described herein.

One or more embodiments described herein can facilitate mobile device communications. In some embodiments, a method is provided. The method comprises determining, by a MSAM system comprising a processor, that a mobile device communicatively coupled to a first network device is associated with a region in which the first network device fails to have line of sight communication with the mobile device. The method also comprises assigning, by the mobile service anchor management system, the mobile device to a second network device determined to have the line of sight communication for the region, wherein the first network device comprises a millimeter wave base station device employing millimeter wave transmissions.

In some embodiments, a system is provided. The system comprises: a processor; and a memory that stores executable instructions that, when executed by the processor, facilitate performance of operations. The operations comprise determining that a mobile device communicatively coupled to a first network device of a network is located within a region from which a second network device is configured to have line of sight communication with the mobile device over a downlink channel. The operations can also comprise assigning the mobile device to the second network device, wherein a transfer of the mobile device is performed from being communicatively coupled to the first network device to being communicatively coupled to the second network device based on the determining.

In some embodiments, a machine-readable storage medium is provided. The machine-readable storage medium can comprise executable instructions that, when executed by a processor, facilitate performance of operations. The operations can comprise: determining that a mobile device communicatively coupled to a first network device of a first network is projected to enter a coverage area of a second network device of a second network, wherein the second network device is an access point device, and wherein the first network is a first type of network that is different from a second type of the second network. The operations can also comprise assigning the mobile device to the second network device.

FIG. 1 illustrates an example schematic diagram of a system that facilitates MSAM employing a layered network architecture with a BS device uplink channel, a mmW BS device first downlink channel and a non-mmW BS device second downlink channel in accordance with one or more embodiments described herein.

System 100 includes one or more mmW BS devices (e.g., mmW BS devices 104, 124), one or more macro cell BS devices (e.g., macro cell BS devices 102, 112, 134, 125), at least one MSAM system (e.g., MSAM system 128) and/or one or more mobile devices (e.g., mobile device 116). In various embodiments, one or more of the mmW BS devices 104, 124, macro cell BS devices 102, 112, 134, 125, MSAM system 128 and/or mobile device 116 can be electrically and/or communicatively coupled to one another to perform one or more functions of the system 100. While the MSAM system 128 is shown as a separate component from the macro cell BS devices 102, 112, 134, 125 and as a separate component from the mmW BS devices 104, 124, of system 100, in some embodiments, the MSAM system 128 can be included as part of, or electrically or communicatively coupled to, one or more of the macro cell BS devices and/or one or more of the mmW BS devices.

System 100 can improve the utilization of the mmW spectrum through network coordination and thereby enhance provisioning of mobile services. The service architecture of system 100 follows the state of art in radio technology but targets the coordination of service delivery over an entire licensed spectrum of a service provider. In other embodiments, described with reference to system 400 and FIG. 4, coordination for service delivery incorporating unlicensed radio frequency bands will also be discussed and are envisaged herein.

In the network architecture shown in system 100, the services and the network in individual licensed RF bands need not be independent of each other but, rather, can be coordinated in order to optimize or improve the overall mobile radio service delivery. This proposed network architecture can be described as a harmonized model (in some embodiments, with the MSAM system 128 being a macro cellular system component) implemented as a service anchor that initiates mobile access and manages the service traffic flows among the anchor subnet access, small cell BS device offloading, and super mmW BS device subnet access. The small cell BS offloading subsystem can employ either the same RF spectrum as the macro cellular subsystem or unlicensed spectrum. One or more embodiments of the system 100 can focus on an mmW BS device super cell site area of service and infrastructure to make its cell coverage wider than the present indoor systems and as wide as or greater than the macro cell BS device cell site of service while still providing support for the mobile device uplink control.

System 100 of FIG. 1 shows a network architecture that can provide or facilitate service coverage of harmonized radio networks with a 3-layered mobile service delivery using a macro cell BS device for the uplink channel. System 100 includes a network having multiple different types of BS devices providing different cell site areas of coverage, at least one mobile device and a MSAM system that can assign resources for mobile device services provisioning employing use of downlink and/or uplink channels facilitated via the one or more BS devices. The embodiment shown is one example of a configuration of BS devices and cell site areas of services. In other embodiments, any number of different arrangements or number or types of BS devices and/or cell site arrangement to one another can be provided and are envisaged. The cell site areas of service and BS devices can provide a network architecture that has multiple layers for various different permutations of downlink channel and/or uplink channel communication options thereby improving service provisioning to the mobile device and more efficiently utilizing network resources.

Each of the BS devices of the network shown in system 100 is associated with a different cell site area of service. In the embodiment shown, the system 100 includes mmW BS devices 104, 124, which are associated with cell site areas of service 110, 122; and macro cell BS devices 102, 112, 134, 125, which are associated with cell site areas of service 108, 114, 115, 117. In some embodiments, the system 100 is also associated with small cell BS devices (e.g., small cell BS device 106), which is associated with a small cell site area of service 132.

As shown, the different cell site areas of service range in size and, for example, for BS devices transmitting at a high (or higher) power level, the cell site area of service can be larger than the cell site area of service for a BS transmitting at a low (or lower) power level. In some embodiments, higher equivalent/effective isotropically radiated power (EIRP) BS transmission on the downlink channel can be performed at the mmW BS device (e.g., mmW BS device 104) to exceed the typical cell site area (or radius) of service given the inter cell-site distance so as to result in a super cell site area of service. In the embodiment shown, cell site areas of service 110, 122 are larger than cell site areas of service 108, 114, 115, 117 because the power level associated with the downlink channel from the mmW BS devices 104, 124 is greater than the power level associated with the uplink channel from the mobile device 116 to the macro cell BS device (e.g., macro cell BS device 112). This design and/or architecture can address and/or minimize the effect of the limitations of outdoor use typically associated with mmW BS device communication.

In some embodiments, each of mmW BS devices 104, 124, macro cell BS devices 102, 112, 125, 134 and/or small cell BS devices (e.g., small cell BS device 106) can be configured to provide downlink channel communication. For example, as shown in FIG. 1, mmW BS device 104 can be configured to provide communication to mobile device 116 via the downlink channel 118. Because the mmW BS device 104 can use higher power for transmissions than the mobile device 116, the downlink channel 118 (which is provided by the mmW BS device 104) has greater power than the uplink channel 120 from the mobile device 116 to the macro cell BS device 134. Accordingly, the radius or area of the cell site area 110 for the mmW BS device 104 is greater than the cell site area 117 for the macro cell BS device 134. As shown, the system 100 includes a layered architecture of numerous different overlapping cell site areas associated with different levels of BS devices (e.g., mmW BS devices, macro cell BS devices and/or small cell BS devices). In one or more embodiments, the frequency band of the downlink channel (e.g., downlink channel 118) can be distinct from the frequency band of the uplink channel (e.g., uplink channel 120) and can be facilitated via FDD communications.

The MSAM is for the DL in these embodiments, and the UL is separated as part of a scheme for novel FDD operations. This approach can benefit mmW DL operation and make RF resource management more flexible. During the DL RF access reassignment, in some embodiments, the UL connection can remain the same for the original UE access to the local BS device.

The mobile device 116 can be configured to receive and/or transmit information on different frequency bands, including, but not limited to, mmW BS device communication frequency bands. For example, mobile device 116 can be a multi-RF-band mobile device. With wider area mmW BS device service delivery, traffic flow between mmW BS devices and multi-RF-band mobile devices can be separated into downlink channel delivery and uplink channel control. The downlink channel delivery can be provided via one mmW RF band network and the uplink channel delivery can be provided via a second RF band network. Accordingly, in some embodiments, the MSAM system 128 can support FDD operation in which the downlink channel and the uplink channel for a mobile device are on separate frequency bands.

In some embodiments, the mmW BS device 104 delivers the mobile downlink contents only (shown as downlink channel 118 in FIG. 1, for example). The uplink channel control for the mobile device 116 utilizes the uplink channel spectrum of the nearby small cell BS device or the macro cell BS device 134 (shown as uplink channel 120 in FIG. 1). The mmW BS device 104 downlink channel 118 coverage can be line-of-sight in some cases, depending on the location of the mobile device 116 and the location of any structures within the cell site 110. In some embodiments, the downlink channel 118 can be adapted to different power levels within a transmit power range. In some embodiments, the MSAM system 128 can determine the transmit power range and/or transmit power level based on different criteria, including, but not limited to, the location of the mobile device 116 relative to the location of the mmW BS device 104.

In some embodiments, the downlink channel 118 for the mmW BS device 104 can be OFDMA-based so that the downlink channel 118 matches the current LTE downlink channel configuration. Based on the OFDMA configuration, the coverage of the mmW BS device 104 cell site area of service can be omnidirectionally delivered to provide mobile broadcast or multicast streaming services. The configuration can be dynamic in nature, depending on market demands, and therefore can change from time to time.

In some embodiments, the coverage of the mmW BS device 104 cell site 110 area of service coverage can be directionally based on OFDMA beamforming and thus can be configured to adjust to point to or target communications at any mobile device to provide special access for an instantaneous high rate data delivery. Downloading a large file to a mobile device instantly is one example. This special spot delivery can be coordinated by the MSAM system 128.

The MSAM system 128 can evaluate different factors and generate information indicative of one or more transmission parameters (e.g., type of BS device, identity of BS device, frequency band for downlink channel, frequency band for uplink channel, power level for downlink channel, power level for uplink channel) for a type of access to the network device by the mobile device 116. By way of example, but not limitation, the MSAM system 128 can evaluate three layers of architecture and coordinate resources across such layers so that the overall network capacity can be improved and/or maximized and service delivery can therefore be improved and/or optimized. In various embodiments, the MSAM system 128 can be configured to evaluate one or more aspects of the topography of the location of the mobile device 116, the location of the mobile device 116, whether there is line of sight between the mmW BS device and the mobile device 116, availability of particular BS devices and/or cell site areas of service (e.g., traffic loading, interference levels, capacity, etc.) and/or any number of other considerations. The MSAM system 128 can generate and/or transmit information indicative of one or more resource assignments (e.g., BS device, uplink or downlink channel assignment, frequency band assignment) enabling use of the mmW BS device communication or other BS device communication or access point device communication to cover outdoor environment scenarios.

In some embodiments, the MSAM system 128 can have a two-part inquiry. First, the MSAM system 128 can determine whether there is line of sight between the mmW BS device and the mobile device 116. If the MSAM system 128 determines there is line of sight between the mmW BS device and the mobile device 116, in the second inquiry, the MSAM system 128 can determine whether there are resources available from the mmW BS that has line of sight with the mobile device 116. If that particular mmW BS has resources available, the MSAM system 128 can schedule the downlink communication to commence (or, in some cases, continue) between the mmW BS and the mobile device 116. If line of sight does not exist for a particular mmW BS device, the MSAM system can determine whether there are any local BS devices (e.g., small cell devices or macro cell devices) for which resources are available for a downlink channel or whether there are any other mmW BS devices that have line of sight with the mobile device for which resources are available for a downlink channel.

For the embodiments described herein, the MSAM system 128 can evaluate one or more (or all) possible solutions and/or combinations of resource assignments that can be managed within the system 100. The MSAM system 128 can coordinate the various resources across different types of BS devices and/or for different frequencies available. The MSAM system 128 can increase the likelihood of better coverage and efficient utilization of frequency because the MSAM system 128 can serve as a centralized controller. In these embodiments, the MSAM system 128 can facilitate a system that has separate uplink and downlink but novel frequency division duplex (FDD) channels and/or coordination among different frequency bands and/or different devices. The separate uplink and downlink FDD communication described in one or more embodiments herein can include: uplink and downlink FDD access that does not need to be balanced in power and/or in RF reach (and therefore the power and/or the RF reach for the uplink and downlink can differ from one another and/or from time to time); downlink and uplink FDD pairs that are not assigned in a fixed pattern (and therefore the downlink and uplink FDD pair can change from time to time) and/or can be dynamically assigned; and the FDD can provide flexibility to the mobile communications and/or improve mobile service delivery. Data to and/or from a mobile device can be offloaded to a small cell BS device and/or focused high rate delivery case can be provided to a mobile device from an mmW BS device.

One or more of the embodiments described herein can address a challenge inherent in mmW coverage because mmW coverage is primarily line of sight. As such, after a mmW signal collides with a structure in the environment (e.g., building, tree), a shadow region (e.g., dead spot) at which downlink communication from the mmW BS device is diminished and/or eliminated, will form on the opposing side of the structure.

An example shadow region 136 is shown in FIG. 1 based on the building 123. In a large coverage area with many structures, numerous shadow regions can result. The shadow regions can be relative to the location of the particular mmW BS device relative to the location of the structure. For example, a shadow region caused by non-line of sight for one mmW BS device (e.g., mmW BS device 104) can be a non-shadow region for another mmW BS device (e.g., mmW BS device 124) located in a different location.

Thus, in some embodiments, the MSAM system 128 can do a sweep of the cell sites and determine geographical regions within a cell site at which the mmW BS device for the cell site will have a shadow region (e.g., dead spot, dead zone) and determine the alternative BS devices that can provide an alternative downlink channel while the mobile device 116 is in the shadow region (e.g., shadow region 136). Thus, the MSAM system 128 can have a table or other listing of information that is stored in the MSAM system 128 and/or accessible by the MSAM system 128 over a network that indicates, for one or more regions within a cell site, the mmW BS devices that have a shadow region and the other BS devices that can be considered for providing downlink channel communication in the region that is a shadow region for the particular mmW BS device. The information indicative of the locations of the shadow regions can be updated from time to time as the topography of structures changes (e.g., cut down trees to make subdivision) and/or can be determined on the fly as signals start to fade).

The information can be known in advance by the MSAM system 128 in some embodiments, and can be updated from time to time. In some embodiments, the information regarding the locations of the shadow regions for particular mmW BS devices can be determined dynamically in whole or in part, as the MSAM system 128 determines that new structures have been constructed or demolished in various regions of the cell site and/or based on determining a current and/or past history of mmW BS device downlink channel signal degradation at a defined location or within a defined region in the cell site.

In the embodiment shown in FIG. 1, at time 1, the MSAM system 128 determines that the mmW BS device 104 has line of sight with the mobile device 116 and assigns the mmW BS device 104 to provide downlink channel 118 for communicating with the mobile device 116 over the downlink. The uplink channel 120 can be assigned by the MSAM system 128 to be provided by any number of different BS devices (e.g., macro cell BS device 134 as shown in FIG. 1) and is determined as a separate process by the MSAM system. The downlink channel 118 and the uplink channel 120 can be on separate frequency bands in some embodiments.

At time 2, the mobile device 116 moves from one location within cell site 110 to another location within cell site 110. The MSAM system 128 can determine whether line of sight between the mmW BS device (e.g., mmW BS device 104) and the mobile device 116 exists at the new location.

If line of sight is not present and/or line of sight communication has degraded to below a defined level, the MSAM system 128 can assign a local BS device (e.g., a BS device within a defined distance of the mobile device 116 and/or having coverage covering the area in which the mobile device 116 is located) to provide the downlink channel for the mobile device so that service is not interrupted for the mobile device. In the embodiment shown, the MSAM system 128 can assign the macro cell BS device 112 to provide the downlink channel 137 between the macro cell BS device 112 and the mobile device 116.

In various embodiments, shadow regions (e.g., shadow region 136) exist based on the presence of buildings, trees and/or the topography generally in an area. A shadow region 136 can be a region in which the mobile device 116 is blocked from having line of sight with the mmW BS device associated with the cell site in which the mobile device 116 is located. Based on a determination by the MSAM system 128 that the mobile device 116 is within the shadow region 136 or projected to enter the shadow region, the MSAM system 128 can assign a different BS device to provide the downlink channel. In various embodiments, the newly-assigned BS device can provide the downlink channel to the mobile device 116 prior to and/or during entry of the mobile device 116 into the shadow region. In some embodiments, the MSAM system 128 can determine that the mobile device 116 is projected to enter, or has a defined likelihood of entering, a shadow region based on any of a number of factors including, but not limited to, based on an extrapolation from the current trajectory of movement of the mobile device 116, based on previous movement trajectories of the mobile device 116, based on the trajectory of a road or highway along which the mobile device 116 is traveling or the like.

In some embodiments, the MSAM system 128 can determine that the mobile device 116 is in the shadow region 136 based on any number of factors. For example, shadow regions such as shadow region 136 can be mapped and known in advance of traversal of the mobile device 116 across the cell site 110. As another example, the presence of a shadow region 136 can be determined or estimated to be located at any location within the cell site 110 at which the mmW BS device 104 does not have line of sight with the mobile device 116. As another example, a shadow region 136 can be determined or estimated based on previous loss of calls to the mobile device in the region or the like.

At time 2, the MSAM system 128 determines that the mobile device 116 is in a shadow region 136 or projected to enter a shadow region (e.g., projected to enter a shadow region within a defined range of time (e.g., within the next 30 seconds). For example, the MSAM system 128 can estimate time of arrival in the shadow region 136 based on past time of arrival in the shadow region 136 for the mobile device 116, based on the speed of movement of the mobile device 116 or the like. The MSAM system 128 can assign another BS device to the mobile device 116 to provide the downlink channel to the mobile device 116. For example, macro cell BS device 112 can be assigned to the mobile device 116 to provide the downlink channel 133 if the mmW BS device 124 fails to have (or is projected or estimated to fail to have in the near future) line of sight with the mobile device 116.

At time 3, the mobile device 116 can be in a region of the cell site 110 that is not shadow region 136. For example, the mobile device 116 can be in non-shadow region 140 for mmW BS device 104. Upon determining that the mobile device 116 has moved to non-shadow region 140, MSAM system 128 can re-assign the mmW BS device 104 to provide the downlink channel 119 to the mobile device 116. Thus, the mobile device receives the benefit of mmW BS device downlink communication when possible while also receiving the benefit of seamless switching to another BS device to reduce the likelihood or prevent the occurrence of dropped calls, diminished QoE or the like.

If the mobile device 116 is in the region where the mmW BS device 104 has line of sight with the mobile device 116, then, at time 3, the MSAM system 128 can avoid re-assignment of the mobile device 116 to a different BS device and the mmW BS device 104 can remain assigned for the downlink channel (as shown at downlink channel 119). Due to the dynamic nature of the assignment, the MSAM system 128 is configured with intelligence to efficiently assign the downlink channel to the local available downlink channel in time to keep the user session for the mobile device 116 continuous. The local available downlink channel can be the BS device that provides coverage for the local area in which the mobile device is located (e.g., macro cell BS device 112 in the scenario shown in FIG. 1 at time 2). As such, as described with reference to FIG. 1, the MSAM system 128 can assign the mobile device 116 downlink coverage between the mmW BS device 104 and the local BS device 112. The MSAM system 128 can store information regarding the user session so the MSAM system 128 can retrieve information that indicates that the mobile device 116 was previously assigned to the mmW BS device 104, the MSAM system 128 knows that the mobile device 116 is currently assigned to a local BS (e.g., macro cell BS device 112) and the MSAM system 128 therefore knows to re-assign the mobile device 116 back to the mmW BS device 104 after the mobile device 116 moves out of the shadow region 136 into the mmW BS device 104 non-shadow region 140.

In this embodiment, the system 100 provides maximum flexibility for assignment of resources. As shown, the MSAM system 128 can assign the macro cell BS device 134 to facilitate uplink channel connectivity from the mobile device 116. Accordingly, in various embodiments, the BS device that is providing an uplink connection with the mobile device 116 can be a macro cell BS device (e.g., macro cell BS device 134 over uplink channel 120). The MSAM system 128 can flexibly assign downlink resources to one or more different BS devices based on whether the mobile device 116 is in a shadow region for a particular mmW BS device in which the mmW BS device does not have line of sight with the mobile device. Generally, the MSAM system 128 can prioritize the mmW BS device for downlink communication and assign a different type of BS device (e.g., macro cell BS device or small cell BS device) or another mmW BS device in the cases and/or during the time period in which the mmW BS device fails to have line of sight communication with the mobile device 116.

As such, the MSAM system 128 can serve as a manager/network coordinator that assigns resources to address and/or avoid and/or reduce likelihood of encountering the drawbacks of the mmW BS device limitations. The MSAM system 128 can manage the network such that when the mobile device 116 initiates and/or starts a communication session, the MSAM system 128 tracks the location of the mobile device 116 and can assign (over time) one or more different BS devices and/or radio frequencies to the mobile device 116 connection as the mobile device 116 moves from one location to another location. As such, the MSAM system 128 can dynamically assess the location of the mobile device 116 and assign a mobile device 116 a different frequency and/or a different cell from time to time as the mobile device 116 moves about from location to location while enabling the communication session to still continue (and/or continue in lieu of conditions in which the communication session would have been disconnected had the MSAM system 128 not assigned to new resources to the mobile device 116 such as in regions in which the mmW BS device (e.g., mmW BS device 104) fails to have line of sight with the mobile device 116).

As shown and described in FIG. 1, by way of example, but not limitation, in the mmW coverage scenario, when an mmW initiated mobile device access is moving into a non-line of sight area so that the mmW downlink coverage quality is challenged and mmW downlink connection might be forced to drop, the MSAM system 128 can evaluate one or more (or, in some embodiments, all) available local BS devices that can provide a coverage area that includes this specific mobile device, and assign/handoff the mobile device 116 to another BS device in a session continuous fashion. This assigned BS device can support session continued mobile device access under a different RF band or even operate under a different radio technology. In this case, the mobile device 116 can continue the user service session without the service evincing any access change while potentially maintaining a high speed access rate and QoE.

In some embodiments, MSAM can enhance network operation through a newly opened dimension of efficient access management that parallels the efforts of enhanced radio access technology with higher spectral efficiency such as higher quadrature amplitude modulation (QAM), higher level of multiple input multiple output (MIMO) operation, and/or advanced Coordinated Multipoint Transmission and Reception (CoMP) and Enhanced Inter-cell Interference Coordination (eICIC). Compared to these spectral efficiency solutions leading to network complication and raising network cost, the MSAM system can improve mobile radio network operation via the IP network management domain. This results from fundamental changes across current network managements in radio network resources, RAN access technologies, radio network operations, and/or mobile device access.

Spectrum utilization and/or network operation can be improved by making mmW frequency bands available to mobile streaming services in wider area coverage and/or by addressing special device demands for an instantaneous high rate delivery of information. Beyond the wide area coverage in outdoor environments, the mmW bands can also be used in indoor high speed communications. In various embodiments, an mmW BS device can also be assigned to provide communication for indoor and/or small cell areas, and frequency reuse can be employed.

Figure 2:
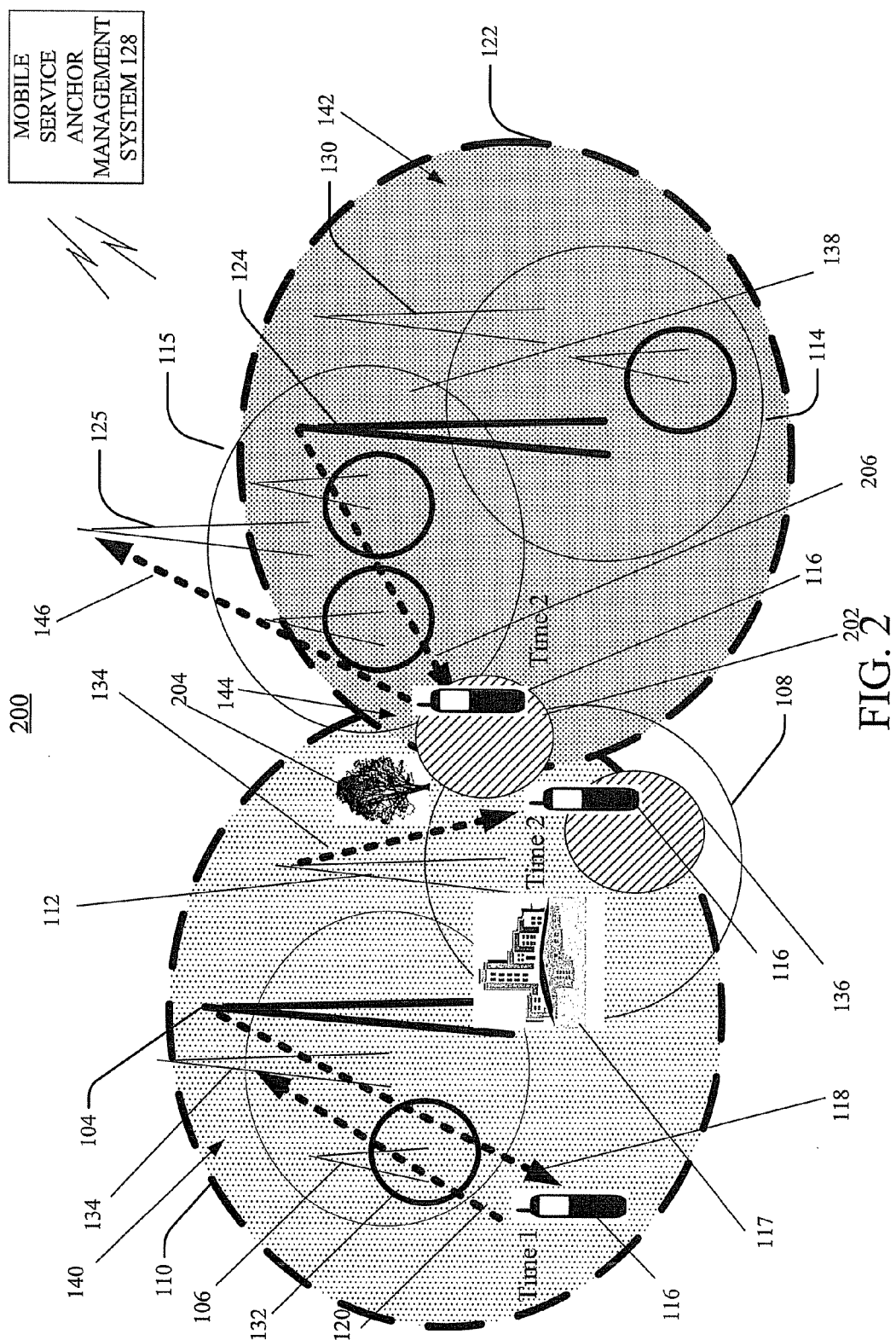
FIG. 2 illustrates another example schematic diagram of a system that facilitates MSAM employing a layered network architecture with a BS device uplink channel, a mmW BS device first downlink channel and a second mmW BS device second downlink channel in accordance with one or more embodiments described herein.

FIG. 2 illustrates another example schematic diagram of a system that facilitates MSAM employing a layered network architecture with a BS device uplink channel, a mmW BS device first downlink channel and a second mmW BS device second downlink channel in accordance with one or more embodiments described herein. Repetitive description of like elements employed in other embodiments described herein is omitted for sake of brevity.

In the embodiment shown, the MSAM system 128 can assign a first downlink channel 118 from one mmW BS device (e.g., mmW BS device 104) to another downlink channel 206 associated with a different mmW BS device (e.g., mmW BS device 124) when the mobile device 116 is in a second shadow region 202 of the mmW BS device 104) and also in the overlap region 144 between cell sites 110 and 122 such that mmW BS device 124 can still provide downlink communication (e.g., via downlink channel 206). In this embodiment, the mobile device 116 is in a region that is in a shadow region 202 for the mmW BS device 104 but is in non-shadow region 142 relative to the mmW BS device 124. Accordingly, the shadow regions in a network are relative to the particular mmW BS device location.

FIG. 2 shows two scenarios of assignments as the mobile device 116 moves from one region to another region within cell sites 110, 122. For example, in the first scenario, at time 1, the MSAM system 128 can assign the mmW BS device 104 to the mobile device 116 for downlink channel communication over downlink channel 118. In one scenario, the mobile device 116 moves to shadow region 136 at time 2 and the MSAM system 128 assigns local BS device 112 to the mobile device 116 for downlink channel communication over downlink channel 134 since the mobile device 116 is only within cell site 110 as opposed to the overlap region 144 between cell site 110 and cell site 122 (thus, mmW BS device 124 cannot provide downlink channel 206 communication with the mobile device 116).

In another scenario, the mobile device 116 moves to shadow region 202 at time 2 and the MSAM system 128 assigns mmW BS device 124 to the mobile device 116 for downlink channel communication over downlink channel 206 (since the mobile device is in the overlap region 144 for mmW BS devices 104, 124). In these embodiments, the MSAM system 128 can assign the downlink channel from one mmW BS device to another mmW BS device since the cell sites 110, 122 created by mmW BS device 104, 124 overlap (e.g., overlap region 144). In these embodiments, the mobile device 116 can move to a new line of sight coverage area associated with another mmW BS device (e.g., mmW BS device 124). As such, in some embodiments, the shadow region for one mmW BS device can be a non-shadow region for another mmW BS device. For example, the MSAM system 128 can transfer the assignment from mmW BS device 104 to mmW BS device 124 since the mobile device 116 is in a shadow region (e.g., second shadow region 202) caused by the structure 204. Due to the location of mmW BS device 104, the location of the structure 204 and the location of the mobile device 116, shadow region 202 is a region in which mmW BS device 104 fails to have line of sight with the mobile device 116; however, the location of mmW BS device 124 and the location of the mobile device 116 allows the mmW BS device 124 to have line of sight with the mobile device 116. Accordingly, the MSAM system 128 assigns the downlink channel 118 from mmW BS device 104 to downlink channel 206b from mmW BS device 124.

The MSAM system 128 can include one or more (or, in some embodiments, all) radio resource bands from a specific service provider in a big resource pool under the control of the MSAM system 128. The MSAM system 128 implementation then goes across the traditional radio frequency pairing (uplink/downlink) specified by the RF allocations or by different radio transmit/receiving protocols. The MSAM system 128 can track one or more (or, in some embodiments, all) active user sessions within its service coverage regardless of which RF bands are being used or which radio access technologies are employed. Once the mobile device access is limited by the network coverage in a shadow region or by potential interference, the MSAM system 128 can coordinate the mobile device access switching to an optimized and/or available local access BS device but anchor the session information. In this way, the user session will not be interrupted but the access challenges to the mobile device 116 can be reduced or resolved, and user QoE can typically be maintained or even improved. In some embodiments, as part of the coordination, the MSAM system 128 can collect access radio information in the IP domain, process the access radio information in the IP domain, and/or assign/handoff the new mobile device radio access in the RF domain.

The MSAM system 128 can be or include hardware, software and/or a combination of hardware and software. In some embodiments, the MSAM system 128 can be a software-centric functional device deployed on the network side that can cover many cell sites and unlicensed wireless access points in a large geographical area. These functional boxes can be internet protocol (IP) inter-connected for information exchanges to manage mobile radio sessions.

The MSAM system 128 can monitor all (or, in some embodiments, multiple) user access sessions within the coverage scope of the MSAM system 128 and/or track the access environment, access challenges, and/or access improvement options and solutions of the mobile devices in the network.

Accordingly, in some embodiments, a first mmW BS device 104 may not have line of sight with the mobile device 116 as the mobile device 116 might be located in a shadow region for the mmW BS device 104 while another mmW BS device (e.g., mmW BS device 124) may have line of sight with the mobile device 116 since the shadow region location is dictated by the location of the mmW BS device 104 and the building (e.g., building 123) or other structure (e.g., tree) causing the shadow region 136. The other BS device to which the MSAM system 128 assigns a second downlink channel 134 can be a macro cell BS device 112 as shown in FIG. 1. In some embodiments, to maintain the same level of downlink capacity, the other BS device to which the MSAM system 128 assigns a second downlink channel can be another mmW BS device (e.g., mmW BS device 124) that has line of sight with the mobile device 116.

Figure 3:
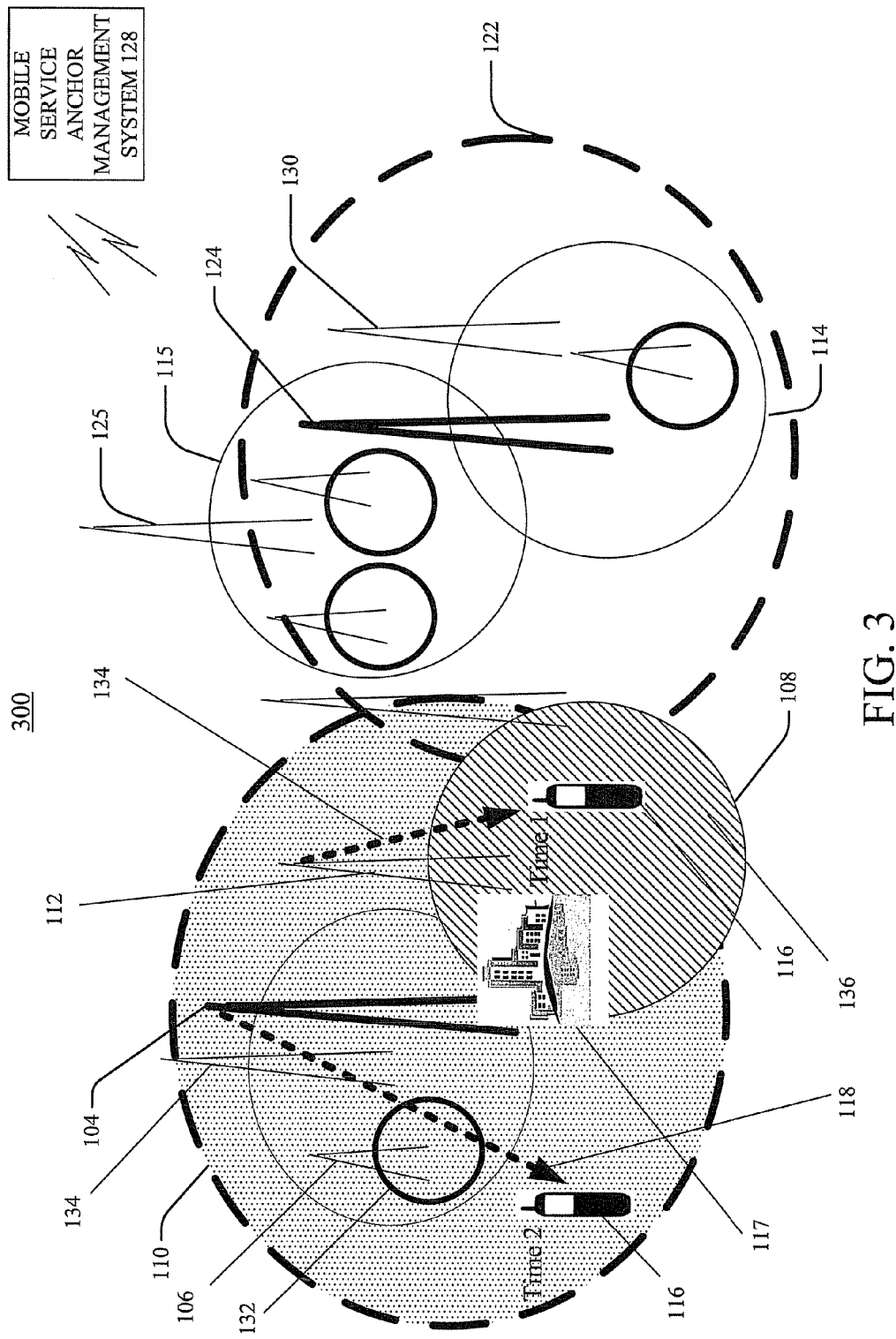
FIG. 3 illustrates an example schematic diagram of another system that facilitates MSAM employing a layered network architecture with a non-mmW BS device first downlink channel and a mmW BS device second downlink channel in accordance with one or more embodiments described herein.

FIG. 3 illustrates an example schematic diagram of another system that facilitates MSAM employing a layered network architecture with a non-mmW BS device first downlink channel and a mmW BS device second downlink channel in accordance with one or more embodiments described herein. Repetitive description of like elements employed in other embodiments described herein is omitted for sake of brevity.

In the embodiment shown in FIG. 3, the mobile device 116 is connected to a BS device 112 providing downlink channel 134 at time 1. The mobile device 116 can power up or otherwise start on this downlink channel 134 for example. The downlink channel 134 can be on any number of different frequencies. For example, in one embodiment, the downlink channel 134 is on the UHF band of 600 MHz.

At time 2, the mobile device 116 can move into a region of cell site 110 at which the mmW BS device 104 has line of sight with the mobile device 116. As such, the MSAM system 128 can determine that the mobile device 116 has moved into a region that is a mmW BS device 104 line of sight area and that mmW BS device 104 has access capacity available. Accordingly, the MSAM system 128 can assign the mobile device 116 downlink channel 134 from 600 MHz to downlink channel 118 based on assigning the mmW BS device 104 to provide a downlink channel to the mobile device 118. The MSAM system 128 can perform such assignment in a session continuous fashion. For example, the MSAM system 128 can release the UHF band spectrum (which will also support more mobile device accesses on the UHF band) and enhance the mobile device 116 access performance under the mmW BS device 104 line of sight condition. While the UHF band is provided, such is a mere example, and any number of different frequency bands can be utilized by the mobile device 116 prior to assigning the mobile device 116 to the mmW BS device 104.

In some embodiments, a UHF band initiated mobile device 116 downlink channel can be assigned to an mmW BS device 104 having line of sight with the mobile device 116 to offload the UHF traffic load and/or to relax the potential of UHF interference challenges. For example, the MSAM system 128 can monitor the UHF band and/or otherwise receive information or make determinations indicating that the interference level of the UHF band satisfies a particular condition (or is projected to satisfy a particular based on current or past information, measurements or the like). For example, the condition can be a defined amount of interference and/or a defined signal-to-noise ratio for the downlink channel on the UHF band. The MSAM system 128 can then assign a mobile device in a line of sight region of a mmW BS device cell site to the mmW BS device to reduce the interference or likelihood of future interference on the UHF band. While the UHF band is provided, such is a mere example, and any number of different frequency bands can be applied in this context for reduction of interference challenges.

As another example, the MSAM system 128 can monitor the UHF band and/or otherwise receive information or make determinations indicating that the traffic level and/or bandwidth utilized of the UHF band satisfies a particular condition (or is projected to satisfy a particular based on current or past or historical information, measurements or the like). The MSAM system 128 can then assign a mobile device in a line of sight region of a mmW BS device cell site to the mmW BS device to reduce the traffic level or bandwidth utilized or likelihood of future interference. While the UHF band is provided, such is a mere example, and any number of different frequency bands can be applied in this context for reduction of traffic and/or bandwidth.

In these embodiments, the mobile device 116 starts a session on the UHF band on the downlink channel. But in order to fully utilize the mmW BS device 104 coverage, once the mobile device 116 moves into a line of sight area of the mmW BS device 104 coverage, the downlink channel 118 can then be assigned to the mmW BS device 104. Accordingly, this embodiment can relax the UHF interference by assigning the downlink channel over to mmW BS device 104.

In one embodiment (not shown), multiple mobile devices can communicate concurrently over a shared spectrum. When multiple (or, in some embodiments, all) legally permitted radio operations in shared spectrum are operating in all (or, in some embodiments, one or more) bands in a defined vicinity, a complicated RF interference scenario can result. The MSAM system 128 can determine that the RF interference for the bands satisfies a defined condition (e.g., the RF interference for one or more bands is greater than or equal to a defined value). The MSAM system 128 can then assign one or more mobile devices to an alternative BS device operating in a different RF band. The cell site can be operated by the mmW BS device or another type of BS device altogether. For example, with reference to FIG. 3, in some embodiments, the MSAM system 128 can assign one or more mobile devices to BS device 112. By doing so, in some embodiments, the interference challenges from spectrum sharing can be reduced or eliminated. Accordingly, the MSAM system 128 can be a solution to support dynamic spectrum sharing.

Figure 4:
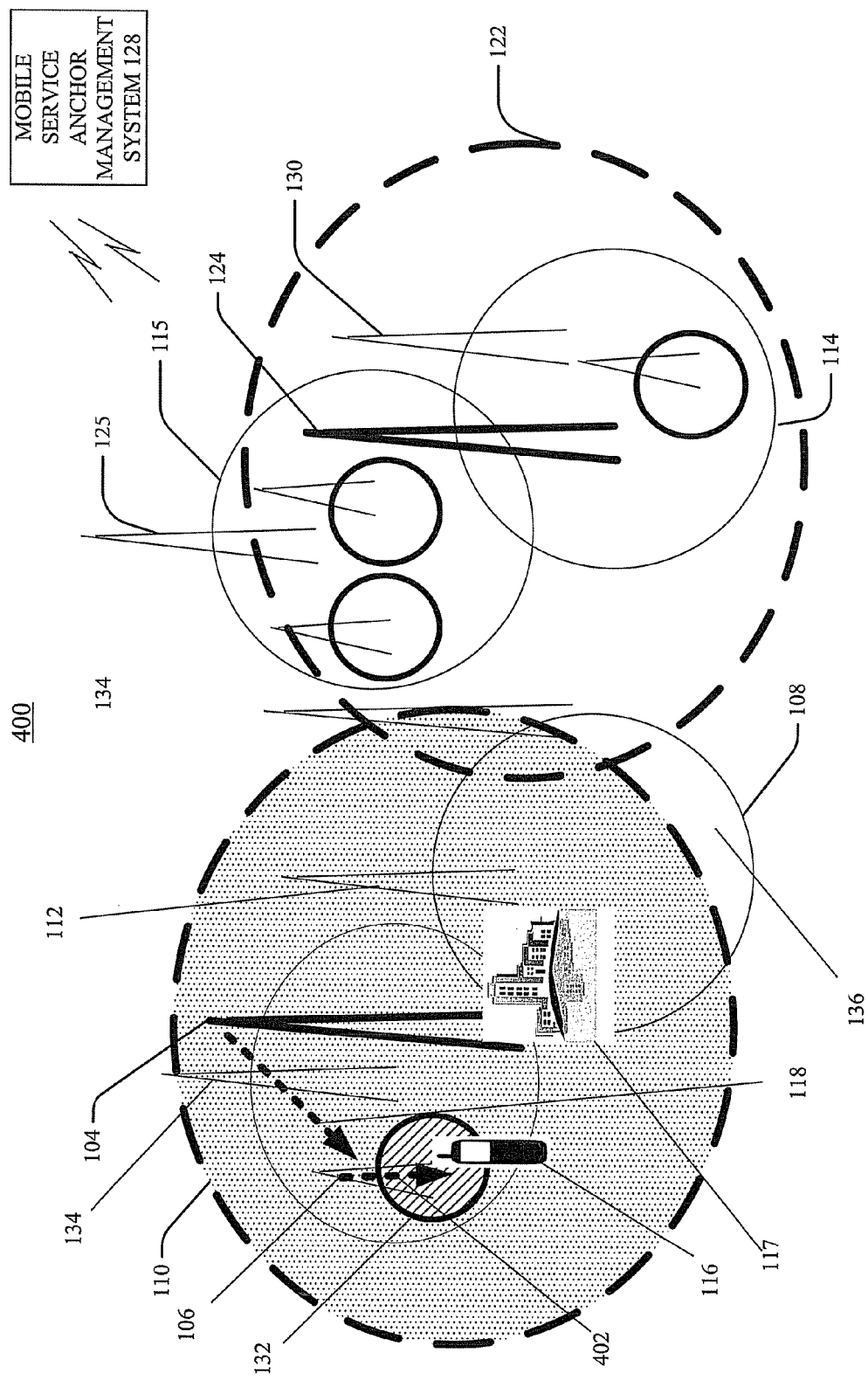
FIG. 4 illustrates an example schematic diagram of another system that facilitates MSAM employing a layered network architecture with a first BS device first downlink channel and an access point device second downlink channel in accordance with one or more embodiments described herein.

FIG. 4 illustrates an example schematic diagram of another system that facilitates MSAM employing a layered network architecture with a first BS device first downlink channel and an access point device second downlink channel in accordance with one or more embodiments described herein. Repetitive description of like elements employed in other embodiments described herein is omitted for sake of brevity.

As shown in FIG. 4, in some embodiments, a small cell BS device (e.g., small cell BS device 106) can be employed by the MSAM system 128 to further provision downlink channel communication. In some embodiments, the small cell BS device can be a device that communicates over an unlicensed RF band. The access point device can be an access point device configured to communicate according to any number of different protocols including, but not limited to, the Wi-Fi communication protocol.

The mobile device 116 can move into cell site 132 associated with a small cell access point device (e.g., small cell BS device 106). In one embodiment, the MSAM system 128 can assign the downlink communication over two BS devices to the mobile device 116. For example, the first portion of the downlink communication can be a downlink channel 118 from the mmW BS device 104 that transmits information from the mmW BS device 104 to the small cell BS device 106. The second portion of the downlink communication can be from the small cell BS device 106 to the mobile device 116 over downlink channel 402. In some embodiments, the access point device 402 is secured and only certain mobile devices have access to the access point device 402 so that QoE can be guaranteed and/or the likelihood of meeting QoE can be improved.

In another embodiment, the mobile device 116 need not be connected to the mmW BS device 104 prior to communicating via the downlink channel 402 via the small cell BS device 106. For example, the mobile device 116 can be connected to any number of other BS devices or any number of other types of BS devices (e.g., BS device 112) prior to connection to the small cell BS device 106.

Accordingly, the mobile streaming session for the mobile device 116 can be continued via streaming content delivery carried over a qualified/secured access. The mobile network can benefit from the traffic offloading to an unlicensed network. The MSAM system 128 can realize the licensed service expansion over the unlicensed network and also be able to maintain the user QoE at a high or satisfactory level.

Figure 5:
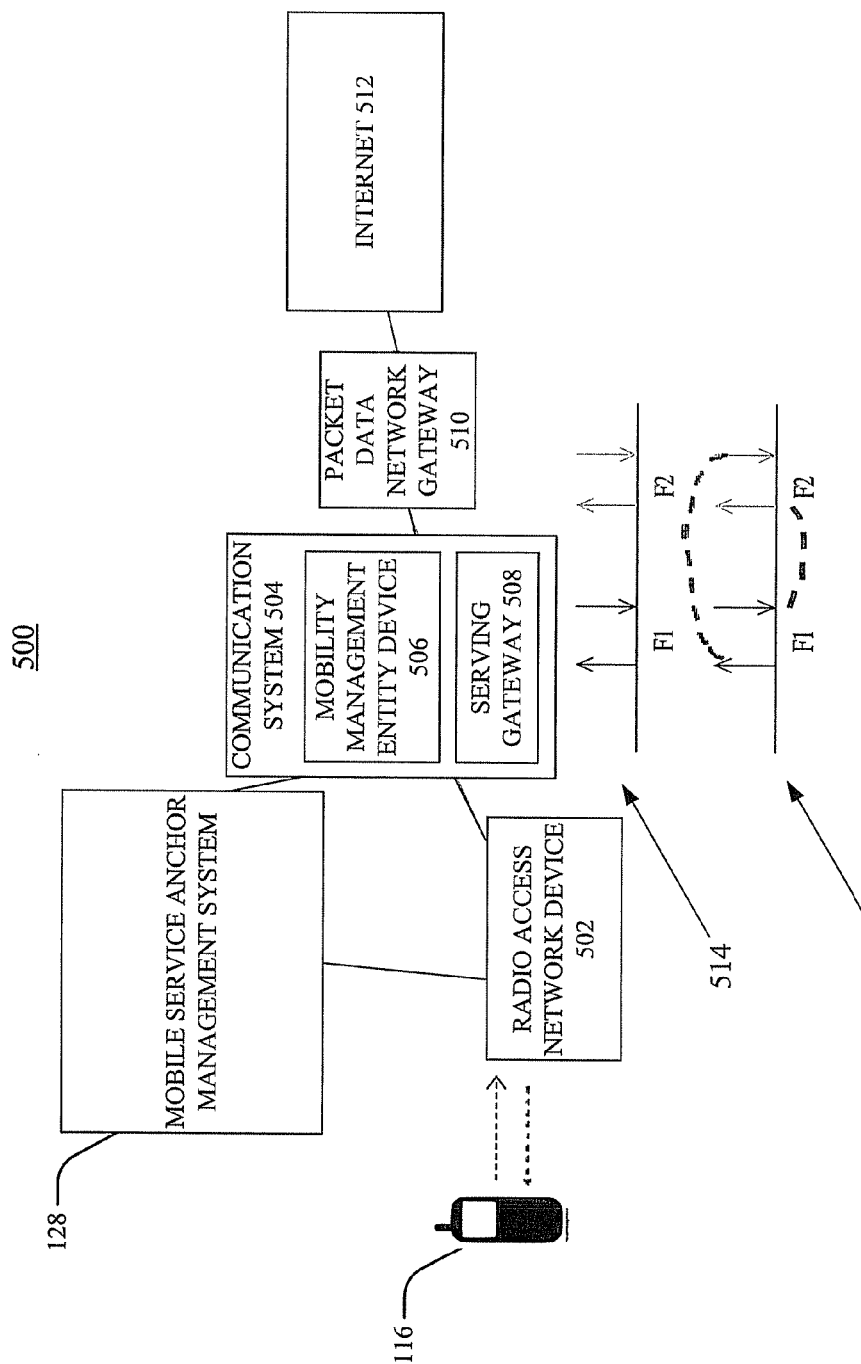
FIG. 5 illustrates an example schematic diagram of a system that facilitates MSAM employing a layered network architecture in accordance with one or more embodiments described herein.

FIG. 5 illustrates an example schematic diagram of a system that facilitates MSAM employing a layered network architecture in accordance with one or more embodiments described herein. Repetitive description of like elements employed in other embodiments described herein is omitted for sake of brevity.

System 500 can be configured to provide intelligent MSAM. The system 500 can include mobile device 116, MSAM system 128, radio access network (RAN) device 502, communication system 504, packet data network (PDN) gateway 510 and/or internet 512. The communication system 504 can include the mobility management entity (MME) device 506 and a serving gateway 508. In various embodiments, one or more of the mobile device 116, MSAM system 128, radio access network (RAN) device 502, communication system 504, packet data network (PDN) gateway 510 and/or internet 512 can be electrically and/or communicatively coupled to one another to perform one or more functions of system 500.

In various embodiments, the MSAM system 128 can be or include software, hardware and/or a combination of software and hardware that can address various radio interference, and/or traffic issues while providing reliable two-way communication that can utilize mmW BS devices.

Accordingly, the MSAM system 128 works as a service anchor point to assign the mobile device 116 to an available local BS device (e.g., local Long Term Evolution (LTE) BS device) to provide mobile device downlink channel access in a session continued fashion. As an alternative to, or in addition to, the conventional FDD assignments, the MSAM system 128 can assign dynamic FDD pairing that can increase the network data capacity through intelligent radio resource management operations of the MSAM system 128. Beyond the conventional FDD, the MSAM system 128 can support separate downlink/uplink FDD operation. In some embodiments, the MSAM system can operate in conjunction with radio platform and IP-session support systems.

The MSAM system 128 can utilize various different RF resources including, but not limited to, mmW BS devices, macro cell BS devices and unlicensed small cell BS devices. In some embodiments, with reference to FIG. 5 at 514, conventional assignment can be via fixed FDD pairing on either a first frequency (F1) or on a second frequency (F2) pair. In the embodiments shown and described herein, as shown at 516 of FIG. 5, the MSAM system 128 FDD pairing can include: capability of pairing an frequency F1 uplink channel (an uplink channel on a first frequency band) with an F2 downlink channel (a downlink channel on a second frequency band) and/or F1 downlink with F2 uplink; and dynamic FDD pairing increases network capacity to handle RF interference and improve access QoE.

In the embodiment shown, the MSAM system 128 can provide anchor support that is separate from downlink and uplink operation. In some embodiments, the downlink and uplink are assigned to a specific band. In this case, they are not assigned to the same band necessarily. So the MSAM system 128 can dynamically assign downlink and uplink. This MSAM system 128 can assign dynamic FDD pairs, which increases downlink capacity through smart radio resource management.

In some embodiments, the MSAM system 128 includes or is software on top of radio network and is providing IP session support for the mobile device. The downlink is on one band, uplink could be on 700 locally available or 2 GHz so that in general, downlink is on one end of band spectrum and uplink on the other end. The downlink could be at a first cell site and uplink could be at a second cell site because the first cell site could have the available downlink band and the second cell site could have the available uplink band. So with two-way communication, one line from the BS device to the mobile device then another channel from the mobile device to an access point device then between the access point device and the BS device can be an IP connection. As such, conventional two-way communication has been varied.

The radio access node (RAN) device 502 can implement one or more different radio access technologies. The RAN device 502 can couple the mobile device 116 to a core network. In some embodiments, the RAN device 502 can be one or more of the mmW BS device 104, 124 and/or a local BS device (e.g., local BS device 112).

The MME device 506 can be a control node that provides for idle mode mobile device paging and tagging procedure including retransmissions. The MME device 506 can also select the serving gateway (SGW) for a mobile device (e.g., mobile device 116) at the initial attach and at time of handover. The MME device 506 can also facilitate authentication of the mobile device. The MME device 506 can be aware of the MSAM system 128 to facilitate one or more operations of the MSAM system 128. As such, either the MME device 506 can be coupled to or integrated with the MSAM system 128 and/or communicatively coupled to the MSAM system 128.

The serving gateway 508 can facilitate handovers with neighboring BS devices. For example, the serving gateway 508 can facilitate inter-BS handover, packet routing and packet forwarding. The PDN gateway 510 can provide connectivity from the mobile device 116 to the external packet data networks by being the point of exit and entry of traffic for the mobile device. A mobile device (e.g., mobile device 116) can have simultaneous connectivity with more than one PGW for accessing multiple PDNs. The PDN gateway 510 can also act as the anchor for mobility between different network technologies.

Figure 6:
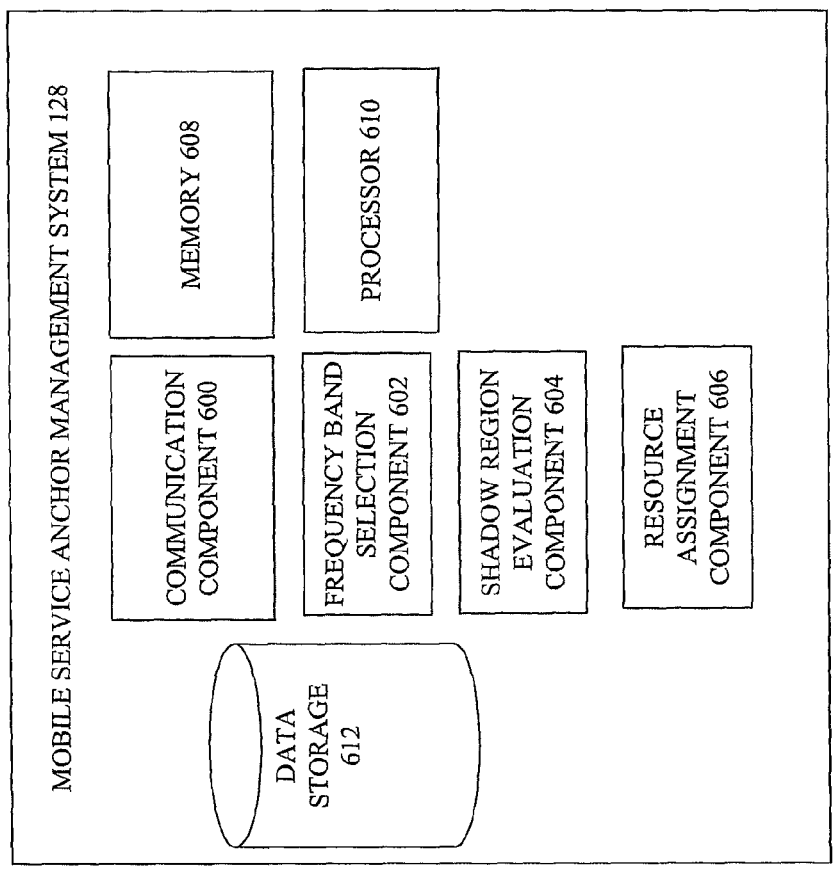
FIG. 6 illustrates an example block diagram of a MSAM system employable in the systems of FIGS. 1, 2, 3 and/or 4 to facilitate MSAM in accordance with one or more embodiments described herein.

FIG. 6 illustrates an example block diagram of a MSAM system employable in the systems of FIGS. 1, 2, 3 and/or 4 to facilitate MSAM in accordance with one or more embodiments described herein. Repetitive description of like elements employed in other embodiments described herein is omitted for sake of brevity.

The MSAM system 128 can include communication component 500, frequency band selection component 502, shadow region evaluation component 504, resource assignment component 506, memory 508, processor 410 and/or data storage 512. In some embodiments, one or more of the communication component 500, frequency band selection component 502, shadow region evaluation component 504, resource assignment component 506, memory 508, processor 510 and/or data storage 512 can be electrically and/or communicatively coupled to one another to perform one or more functions of MSAM system.

The communication component 600 can be configured with one or more different interfaces that can facilitate communication between the MSAM system 128 and one or more of the BS devices. For example, over the one or more different interfaces, information can be transmitted and/or received to and/or from one or more different types of BS devices (e.g., mmW BS devices, macro cell BS devices and/or small cell BS devices). Accordingly, in some embodiments, the BS devices can be connected to, or at least communicatively coupled to, the MSAM system 128 in order to receive information that informs the BS device of a schedule of a frequency to employ for downlink and/or uplink channel communication.

By way of example, but not limitation, the information transmitted and/or received via the one or more different interfaces can include transmission of scheduling information (e.g., uplink channel assignment, downlink channel assignment), BS selection information (e.g., selection of a particular BS device for downlink channel communication, selection of a particular BS device for uplink channel communication), receipt of BS device resource and/or availability information, or the like. In cases in which the mobile device is located within or is approaching a cell site of a small cell BS device that is secured, the information transmitted and/or received via the one or more different interfaces can be authentication and/or identification information for the mobile device. In some embodiments, the information can be information indicative of current or past signal strength, shadow regions, road or highway trajectories, mobile device trajectories or the like.

The shadow region evaluation component 604 can determine whether line of sight exists between an mmW BS device and the mobile device and/or evaluate whether one or more structures is likely to or is causing a shadow region. The resource assignment component 606 can determine which BS devices and/or frequencies are available to service the mobile device. The frequency band selection component 602 can determine the frequency band for use by the mobile device for the uplink channel and for the downlink channel. The frequency band selection component 602 can also determine the frequency band to which to switch as the mobile device traverses one or more cell sites.

Memory 608 can be a computer-readable storage medium storing computer-executable instructions and/or information configured to perform one or more of the functions described herein with reference to the MSAM system 128. The resource information, BS device identities and cell sites, mobile device identities, shadow region information and the like can be stored in the data storage 612 and/or otherwise accessible to the MSAM system 128 over a network (e.g., Internet 512 of FIG. 5). The processor 510 can perform one or more of the functions described herein with reference to the MSAM system 128.

The MSAM system 128 can evaluate different factors and generate information indicative of one or more transmission parameters (e.g., type of BS device, identity of BS device, frequency band for downlink channel, frequency band for uplink channel, power level for downlink channel, power level for uplink channel) for a type of access to the network device by the mobile device as described herein.

In some embodiments, a MSAM system 128 can be provided at one or more (or at each) BS device of the systems of FIGS. 1, 2, 3 and/or 4. In some embodiments, the MSAM system 128 can be a core element node, which is included as part of the mobility architecture for the system 100, 200, 300, 400, 500. In this embodiment, the MSAM system 128 can provide one or more functions associated with spectrum and/or resource management.

Figure 7:
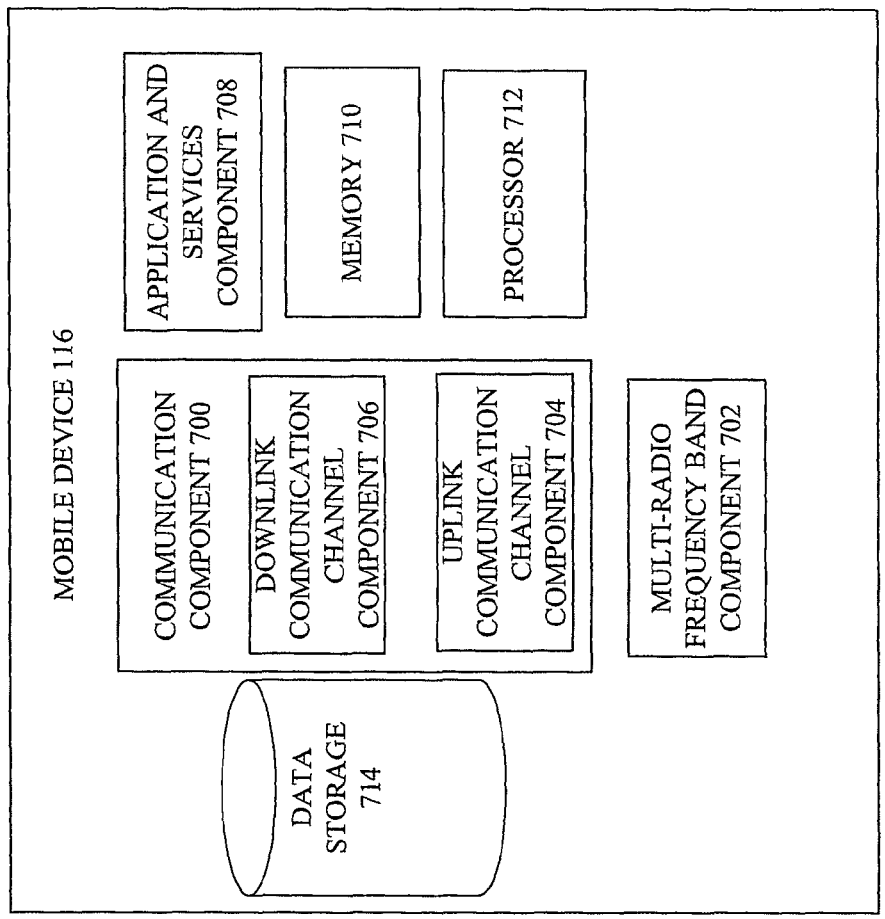
FIG. 7 illustrates an example block diagram of a mobile device for which MSAM can be provided in accordance with one or more embodiments described herein.

FIG. 7 illustrates an example block diagram of a mobile device for which MSAM can be provided in accordance with one or more embodiments described herein. Repetitive description of like elements employed in other embodiments described herein is omitted for sake of brevity.

The mobile device 116 can include communication component 700, (which can include downlink communication channel component 706 and uplink communication channel component 704), multi-RF band component 702, application and services component 708, memory 710, processor 712 and/or data storage 714. In various embodiments, one or more of communication component 700, (which can include downlink communication channel component 706 and uplink communication channel component 704), multi-RF band component 702, application and services component 708, memory 710, processor 712 and/or data storage 714 can be electrically and/or communicatively coupled to one another to perform one or more functions of mobile device 116.

The communication component 700 can transmit and/or receive information to and/or from mobile device 116. For example, the information can be a request for service and/or access to a network, assignment information from a MSAM system regarding one or more resources assigned to the mobile device 116 for uplink channel or downlink channel communication or the like.

The downlink communication channel component 706 can process information received on the downlink (e.g., from the BS device assigned to the mobile device by the MSAM system 128). The uplink communication channel component 704 can process information transmitted on the uplink (e.g., to the BS device assigned to the mobile device by the MSAM system 128). The downlink communication channel component 706 and the uplink communication channel component 704 can be configured to facilitate and/or perform FDD communication for the mobile device 116 as dictated by the MSAM system 128.

The multi-RF band component 702 can select one or more frequency bands on which to transmit and/or receive information. For example, the multi-RF band component 702 can select a frequency band for downlink channel communication such that information can be received on the downlink channel from an mmW BS device, from a small cell BS device operating on an unlicensed frequency band and/or from a macro cell BS device. Application and services component 708 can process and/or execute instructions to perform one or more operations of an application or service requested by or provided to the mobile device 116. Memory 710 can be a computer-readable (or machine-readable) storage medium storing computer-executable instructions and/or information configured to perform one or more of the functions described herein with reference to the mobile device 116. The processor 712 can perform one or more of the functions described herein with reference to the mobile device 116.

In various embodiments, the mobile device 116 can be or include a smart phone, a laptop, a tablet, a wearable device or any number of different types of devices that can be mobile from time to time.

Figure 8:
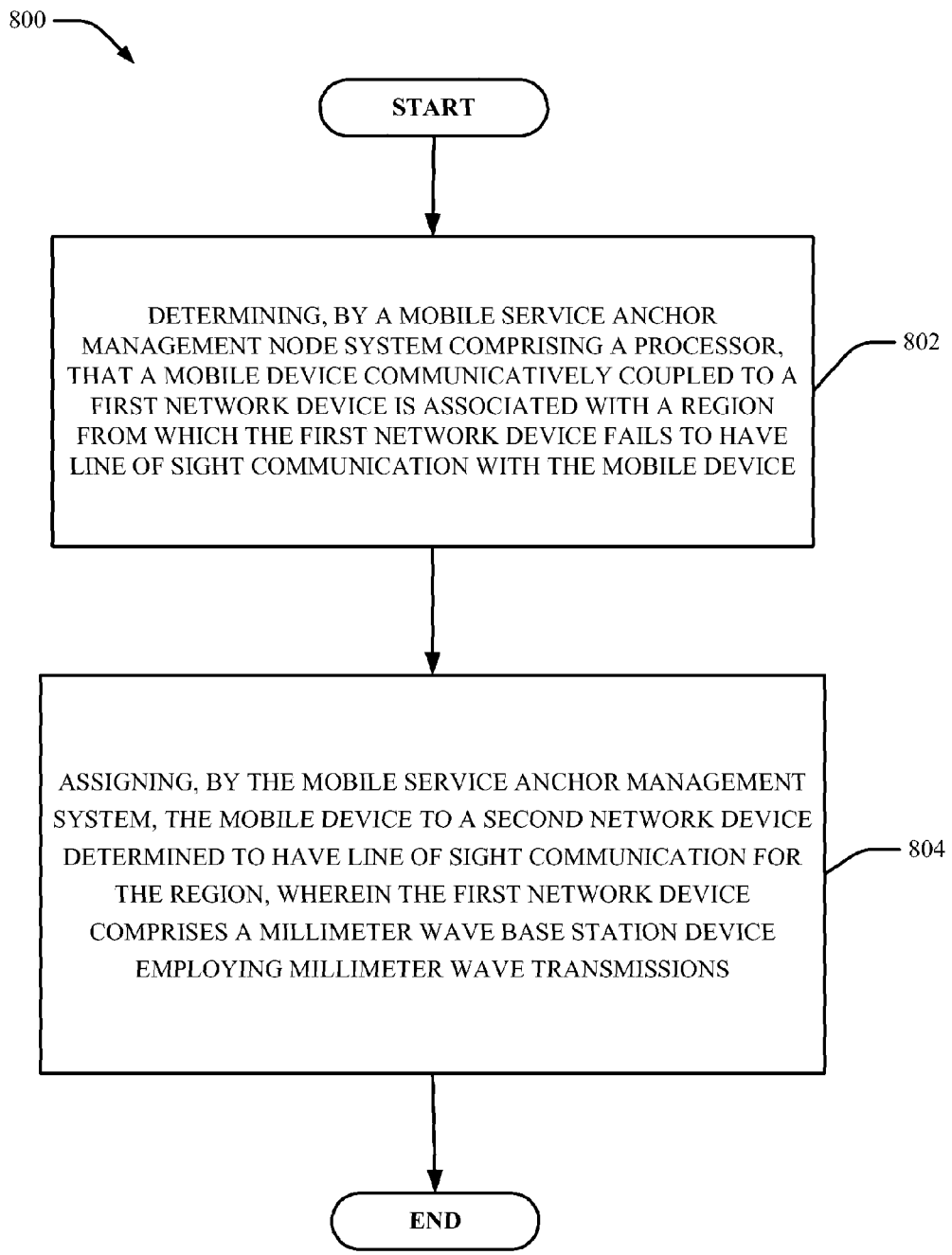
FIGS. 8, 9 and 10 are flowcharts of methods that facilitate MSAM in accordance with one or more embodiments described herein.
Figure 9:
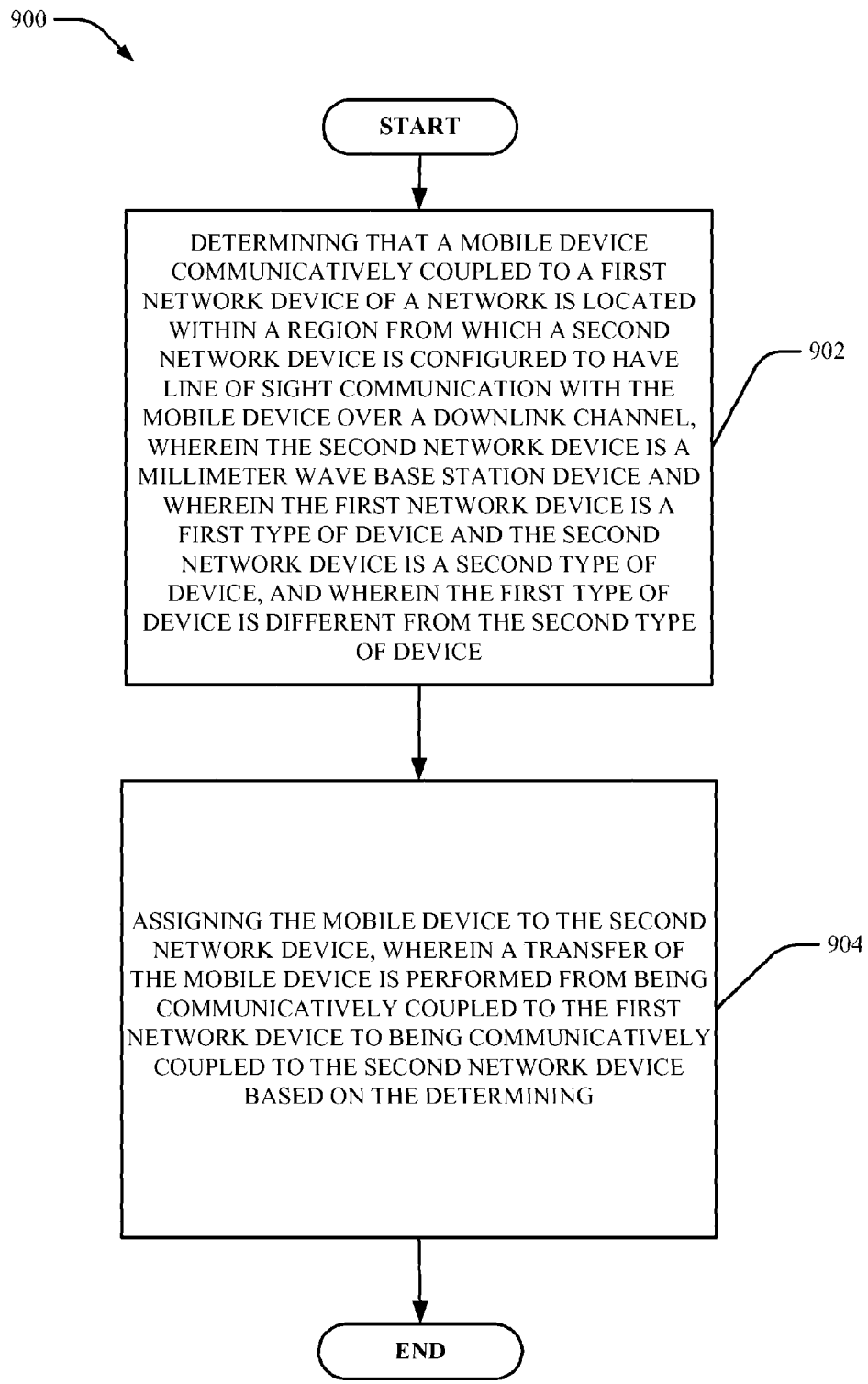
Figure 10:
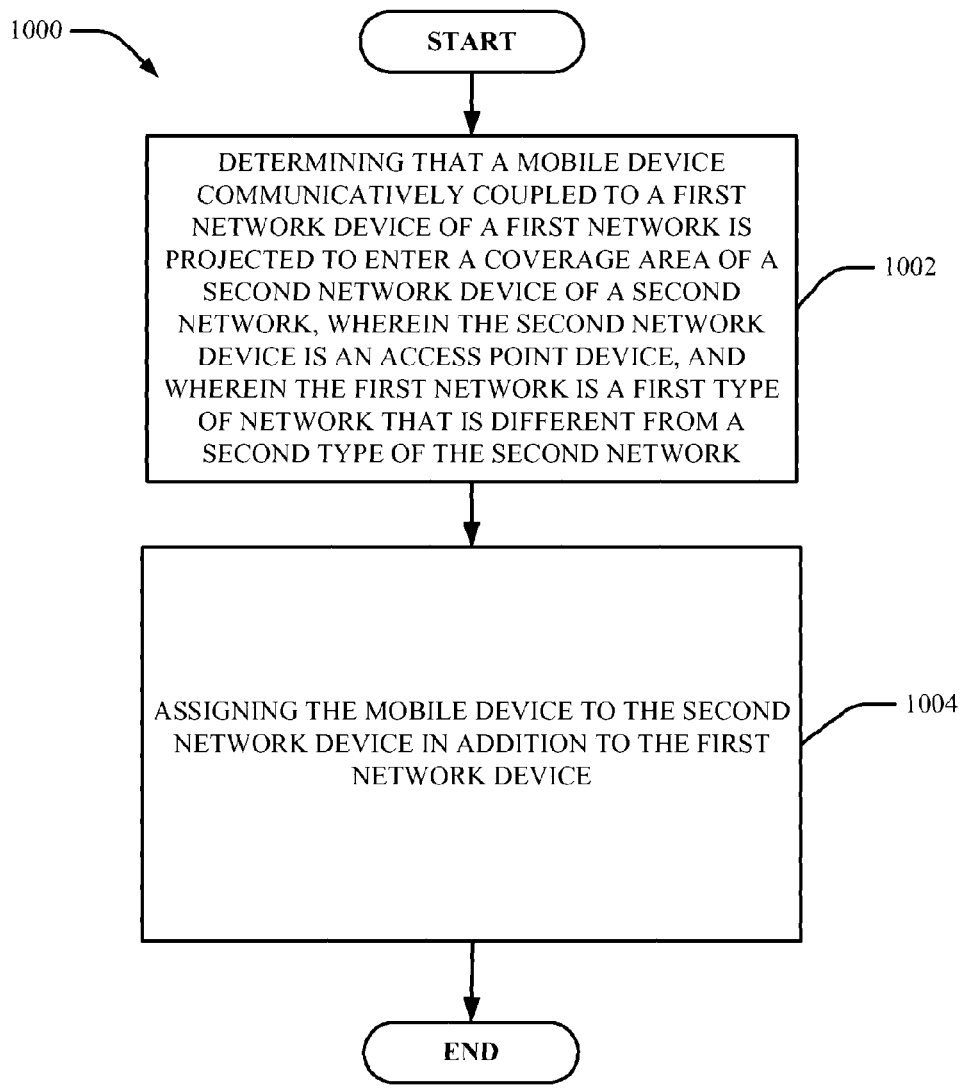

FIGS. 8, 9 and 10 are flowcharts of methods that facilitate MSAM in accordance with one or more embodiments described herein. Turning first to FIG. 8, at 802, method 800 can include determining, by a MSAM system comprising a processor, that a mobile device communicatively coupled to a first network device is associated with a region in which the first network device fails to have line of sight communication with the mobile device. For example, the MSAM system can determine that one or more areas within a cell site correspond to respective regions in which a mmW BS device fails to have line of sight with a mobile device based on the presence of a structure at a particular location within the cell site relative to the location of the mmW BS device. In various embodiments, the determination is performed after the mobile device enters the region. In some embodiments, the determination can be made prior to the mobile device entering the region.

In some embodiments, the mobile device performance and/or whether the BS device has line of sight communication with the mobile device is based on information reported to the MSAM system via the mobile device channel quality indicator (CQI) information. In other embodiments, the MSAM system can make such determination regarding whether there is line of sight between the mobile device and the BS device based on any number of different types of information or reports and/or based, in some embodiments, on information derived or computed or calculated in whole or in part by the MSAM system itself.

At 804, method 800 can include assigning, by the MSAM system, the mobile device to a second network device determined to have line of sight communication for the region, wherein the first network device comprises a mmW BS device employing mmW transmissions. The second device can be a device that employs mmW communication and has line of sight with the region or a device that employs communication other than mmW communication. Devices that employ communication other than mmW communication need not have line of sight with the mobile device within the region.

In some embodiments, the assigning comprises assigning of a first downlink channel between the second network device and the mobile device. The first network device can be configured to communicate with the mobile device via a second downlink channel.

In some embodiments, the downlink channel is associated with a first power and an uplink channel is associated with a second power. The first power can be greater than the second power.

In some embodiments, the uplink channel is between the mobile device and a third network device that is different from the first network device and the second network device. In some embodiments, the downlink channel provides communication in an outdoor environment between the mmW BS device and the mobile device.

The first downlink channel can be associated with a first radio frequency band, and the second downlink channel can be associated with a second radio frequency band. In some embodiments, the first radio frequency band and the second radio frequency band are non-overlapping.

In some embodiments, assigning the mobile device to the second network device of the network results in a continued session of communication for the mobile device in lieu of a session provided via a mmW BS device ending or being reduced in quality due to lack of line of sight for the mmW BS device. Accordingly, a first QoE provided to the mobile device prior to the assigning can be substantially the same as a second QoE provided to the mobile device after the assigning.

In some embodiments, although not shown, method 800 can include determining, by the MSAM system comprising a processor, that the mobile device communicatively coupled to the second network device is projected to enter a second region from which the first network device will have line of sight communication with the mobile device. Although also not shown, method 800 can also include assigning, by the MSAM system, the mobile device from the second network device to the first network device of the network based on the determining that the mobile device communicatively coupled to the second network device is projected to enter the second region from which the first network device will have line of sight communication with the mobile device.

Turning now to FIG. 9, at 902, method 900 can include determining that a mobile device communicatively coupled to a first network device is located within a region from which a second network device is configured to have line of sight communication with the mobile device over a downlink channel. At 904, method 900 can include assigning the mobile device to the second network device, wherein handoff is performed from the first network device to the second network device based on the determining.

In some embodiments, the mobile device is configured to communicate within a UHF radio frequency band, which is non-overlapping with a frequency band over which the mmW BS device is configured to communicate. In some embodiments, potential and/or actual interference within the UHF band is reduced based on the assigning.

In some embodiments, an uplink channel associated with another BS device is provided via a first frequency band and the downlink channel is provided via a second frequency band. The first frequency band can be different from the second frequency band.

Turning now to FIG. 10, at 1002, method 1000 can include determining that a mobile device communicatively coupled to a first network device of a first network is projected to enter a coverage area of a second network device of a second network, wherein the second network device is an access point device, and wherein the first network is a first type of network that is different from a second type of the second network. At 1004, method 1000 can include assigning the mobile device to the second network device in addition to the first network device. For example, the first network device can be configured to provide a first downlink channel from the first network device to the second network device and the second network device can be configured to provide a second downlink channel from the second network device to the mobile device.

In some embodiments, the second network device is configured to communicate over an unlicensed radio frequency band. In some embodiments, a first QoE prior to the assigning, and while the mobile device is communicating with the first network device, is the same as a second QoE after the assigning of the mobile device to the second network device so that the QoE is not interrupted or diminished with the assignment to a new BS device.

Figure 11:
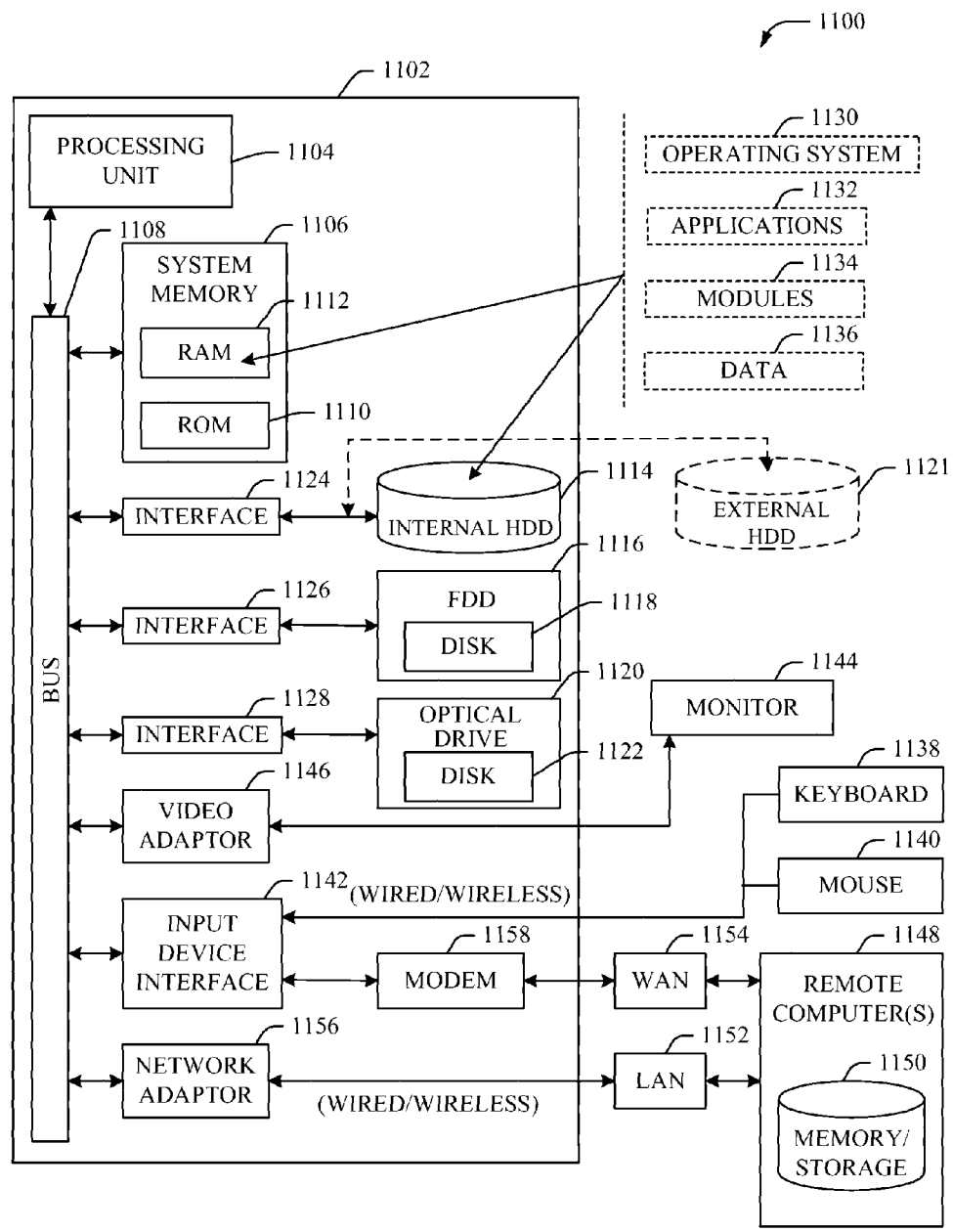
FIG. 11 illustrates a block diagram of a computer that can be employed in accordance with one or more embodiments.

FIG. 11 illustrates a block diagram of a computer that can be employed in accordance with one or more embodiments. Repetitive description of like elements employed in other embodiments described herein is omitted for sake of brevity.

In some embodiments, the computer can be or be included within any number of components described herein comprising, but not limited to, mmW BS devices 104, 124, macro cell BS device 112, mobile device 116, small cell BS device 106, MSAM system 128 (or any components of mmW BS devices 104, 124, macro cell BS device 112, mobile devices 116, small cell BS device 106, and/or MSAM system 128).

In order to provide additional text for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can include computer-readable (or machine-readable) storage media and/or communications media, which two terms are used herein differently from one another as follows. Computer-readable (or machine-readable) storage media can be any available storage media that can be accessed by the computer (or a machine, device or apparatus) and includes both volatile and nonvolatile media, removable and non-removable media. By way of example, and not limitation, computer-readable (or machine-readable) storage media can be implemented in connection with any method or technology for storage of information such as computer-readable (or machine-readable) instructions, program modules, structured data or unstructured data. Tangible and/or non-transitory computer-readable (or machine-readable) storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage, other magnetic storage devices and/or other media that can be used to store desired information. Computer-readable (or machine-readable) storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable (or machine-readable) media, is to be understood to exclude only propagating intangible signals per se as a modifier and does not relinquish coverage of all standard storage, memory or computer-readable (or machine-readable) media that are not only propagating intangible signals per se.

In this regard, the term "non-transitory" herein as applied to storage, memory or computer-readable (or machine-readable) media, is to be understood to exclude only propagating transitory signals per se as a modifier and does not relinquish coverage of all standard storage, memory or computer-readable (or machine-readable) media that are not only propagating transitory signals per se.

Communications media typically embody computer-readable (or machine-readable) instructions, data structures, program modules or other structured or unstructured data in a data signal such as a modulated data signal, e.g., a channel wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1110 (e.g., EIDE, SATA), which internal hard disk drive 1114 can also be configured for external use in a suitable chassis (not shown), a magnetic floppy disk drive 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface, respectively. The interface 1124 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable (or machine-readable) storage media provide nonvolatile storage of data, data structures, computer-executable instructions, and so forth. For the computer 1102, the drives and storage media accommodate the storage of any data in a suitable digital format. Although the description of computer-readable (or machine-readable) storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

A communication device can enter commands and information into the computer 1102 through one or more wired/wireless input devices, e.g., a keyboard 1138 and a pointing device, such as a mouse 1140. Other input devices (not shown) can include a microphone, an infrared (IR) remote control, a joystick, a game pad, a stylus pen, touch screen or the like. These and other input devices are often connected to the processing unit 1104 through an input device interface 1142 that can be coupled to the system bus 1108, but can be connected by other interfaces, such as a parallel port, an IEEE 1394 serial port, a game port, a universal serial bus (USB) port, an IR interface, etc.

A monitor 1144 or other type of display device can be also connected to the system bus 1108 via an interface, such as a video adapter 1146. In addition to the monitor 1144, a computer typically includes other peripheral output devices (not shown), such as speakers, printers, etc.

The computer 1102 can operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1152 through a wired and/or wireless communication network interface or adapter 1156. The adapter 1156 can facilitate wired or wireless communication to the LAN 1152, which can also include a wireless AP disposed thereon for communicating with the wireless adapter 1156.

When used in a WAN networking environment, the computer 1102 can include a modem 1158 or can be connected to a communications server on the WAN 1154 or has other means for establishing communications over the WAN 1154, such as by way of the Internet. The modem 1158, which can be internal or external and a wired or wireless device, can be connected to the system bus 1108 via the input device interface 1142. In a networked environment, program modules depicted relative to the computer 1102 or portions thereof, can be stored in the remote memory/storage device 1150. It will be appreciated that the network connections shown are example and other means of establishing a communications link between the computers can be used.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a defined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a femto cell device. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10 Base T wired Ethernet networks used in many offices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of an acquired network. A classifier is a function that maps an input attribute vector, $x=(x1, x2, x3, x4, \ldots, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a communication device desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing communication device behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As employed herein, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of communication device equipment. A processor can also be implemented as a combination of computing processing units.

As used herein, terms such as "data storage," "database," and substantially any other information storage component relevant to operation and functionality of a component, refer to "memory components," or entities embodied in a "memory" or components including the memory. It will be appreciated that the memory components or computer-readable (or machine-readable) storage media, described herein can be either volatile memory or nonvolatile memory or can include both volatile and nonvolatile memory.

Memory disclosed herein can include volatile memory or nonvolatile memory or can include both volatile and non-volatile memory. By way of illustration, and not limitation, nonvolatile memory can include read only memory (ROM), programmable ROM (PROM), electrically programmable ROM (EPROM), electrically erasable PROM (EEPROM) or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to include, without being limited to, these and any other suitable types of memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
   determining, by a mobile service anchor management system comprising a processor, that a mobile device communicatively coupled to a first network device is associated with a region in which the first network device fails to have line of sight communication with the mobile device;
   assigning, by the mobile service anchor management system, the mobile device to a second network device determined to have the line of sight communication for the region, the first network device being a millimeter wave base station device configured to communicate via millimeter wave transmissions, the millimeter wave base station device being configured to communicate at frequencies of communications from 30 gigahertz to 300 gigahertz, wherein wavelengths of the communications are 1 millimeter to 10 millimeters;
   managing, by the mobile service anchor management system, as an intermediary device, communications between the millimeter wave base station device and the mobile device; and
   providing, by the mobile service anchor management system, offloading for other base station devices other than the millimeter wave base station device.

2. The method of claim 1, wherein the assigning comprises assigning a first downlink channel between the second network device and the mobile device, the first network device being configured to communicate with the mobile device via a second downlink channel and the determining that the first network device fails to have line of sight communication with the mobile device being performed after the mobile device enters the region in which the first network device is located.

3. The method of claim 2, wherein the first downlink channel is associated with a first radio frequency band, the second downlink channel being associated with a second radio frequency band, and the first radio frequency band and the second radio frequency band being non-overlapping.

4. The method of claim 2, wherein the assigning comprises:
   assigning the first downlink channel and the second downlink channel in response to the determining.

5. The method of claim 2, wherein the mobile device communicates with the first network device and the second network device over downlink channels, the downlink channels being separate from an uplink channel over which the mobile device communicates, and one of the downlink channels and the uplink channel facilitating frequency division duplex communication.

6. The method of claim 1, the millimeter wave base station device is a first millimeter wave base station device, and the second network device being a second millimeter wave base station device that employs the millimeter wave transmissions, and communicates at the frequencies from 30 gigahertz to 300 gigahertz with the wavelengths from 1 millimeter to 10 millimeters.

7. The method of claim 1, the second network device being other than the millimeter wave base station device and employing transmissions other than the millimeter wave transmissions.

8. The method of claim 1, further comprising:
   enabling, by the mobile service anchor management system, a first quality of experience for the mobile device prior to the assigning, the first quality of experience being substantially similar to, or the same as, a second quality of experience provided to the mobile device after the assigning.

9. The method of claim 2, the second downlink channel being associated with a first power, an uplink channel being associated with a second power, and the first power being greater than the second power.

10. The method of claim 9, the uplink channel being between the mobile device and a third network device that is different from the first network device and the second network device.

11. The method of claim 2, the second downlink channel enabling the communication in an outdoor environment between the millimeter wave base station device and the mobile device.

12. The method of claim 1, wherein the region is a first region, and further comprising:
   determining, by the mobile service anchor management system, that the mobile device communicatively coupled to the second network device has entered a second region from which the first network device has the line of sight communication with the mobile device.

13. The method of claim 12, further comprising:
assigning, by the mobile service anchor management system, the mobile device from the second network device to the first network device based on the determining that the mobile device communicatively coupled to the second network device has entered the second region from which the first network device has the line of sight communication with the mobile device.

14. A system, comprising:
a processor; and
a memory that stores executable instructions that, when executed by the processor, facilitate performance of operations, comprising:
determining that a mobile device communicatively coupled to a first network device of a network is located within a region, the region being an area from which a second network device is configured to have line of sight communication with the mobile device over a downlink channel;
assigning the mobile device to the second network device, a transfer of the mobile device being performed from being communicatively coupled to the first network device to being communicatively coupled to the second network device based on the determining, the first network device being a millimeter wave base station device employing millimeter wave transmissions, and the millimeter wave base station device being a base station device configured to transmit at frequencies from 30 gigahertz to 300 gigahertz and with wavelengths from 1 millimeter to 10 millimeters;
managing, as an intermediary device, communications between the millimeter wave base station device and the mobile device; and
enabling offloading for other base station devices other than the millimeter wave base station device.

15. The system of claim 14, the mobile device being configured to communicate within an ultra high frequency radio frequency band which is non-overlapping with a frequency band over which a millimeter wave base station device is configured to communicate, and the second network device being the millimeter wave base station device.

16. The system of claim 15, a level of interference within the ultra high frequency band being reduced based on the assigning.

17. The system of claim 14, the millimeter wave base station device being a first base station device, an uplink channel associated with a second base station device being provided via a first frequency band, the downlink channel being provided via a second frequency band, and the first frequency band being different from the second frequency band.

18. The method of claim 1, wherein the frequencies are inversely proportional to the wavelengths.

19. A non-transitory machine-readable medium, comprising executable instructions that, when executed by a processor, facilitate performance of operations, comprising:
determining that a mobile device communicatively coupled to a first network device of a first network is projected to enter a coverage area of a second network device of a second network, wherein the second network device is an access point device, and wherein the first network is a first type of network that is different from a second type of the second network;
assigning the mobile device to the second network device in addition to the first network device, wherein the first network device comprises a millimeter wave base station device employing millimeter wave transmissions, and wherein the millimeter wave base station device is a base station device configured to receive communications at frequencies in a first range from 30 gigahertz to 300 gigahertz comprising wavelengths in a second range from 1 millimeter to 10 millimeters;
managing communications between the millimeter wave base station device and the mobile device; and
facilitating offloading for other base station devices other than the millimeter wave base station device.

20. The non-transitory machine-readable medium of claim 19, wherein the first type of network is based on a first communication protocol, wherein the first network device is configured to provide a first downlink channel from the first network device to the second network device, and wherein the second network device is configured to provide a second downlink channel from the second network device to the mobile device.

* * * * *